(12) United States Patent
LePoudre et al.

(10) Patent No.: US 10,712,024 B2
(45) Date of Patent: Jul. 14, 2020

(54) LIQUID TO AIR MEMBRANE ENERGY EXCHANGERS

(71) Applicant: Nortek Air Solutions Canada, Inc., Saskatoon (CA)

(72) Inventors: Philip Paul LePoudre, Saskatoon (CA); Mehran Seyed Ahmadi, Saskatoon (CA); John Charles Bolster, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 436 days.

(21) Appl. No.: 14/830,492

(22) Filed: Aug. 19, 2015

(65) Prior Publication Data

US 2016/0054012 A1     Feb. 25, 2016

Related U.S. Application Data

(60) Provisional application No. 62/039,254, filed on Aug. 19, 2014.

(51) Int. Cl.
*F24F 3/14*      (2006.01)
*F28D 21/00*     (2006.01)
(Continued)

(52) U.S. Cl.
CPC ............ *F24F 3/1417* (2013.01); *F24F 3/147* (2013.01); *F24F 12/002* (2013.01); *F28D 21/0015* (2013.01); *Y02B 30/563* (2013.01)

(58) Field of Classification Search
CPC ................................................ F24F 2003/1435
See application file for complete search history.

(56) References Cited

U.S. PATENT DOCUMENTS

| 1,015,831 A | 1/1912 | Pielock et al. |
| 2,186,844 A | 1/1940 | Smith |

(Continued)

FOREIGN PATENT DOCUMENTS

| AU | 2011286700 A1 | 12/2012 |
| AU | 2011268661 A1 | 1/2013 |

(Continued)

OTHER PUBLICATIONS

"AAONAIRE® Energy Recovery Units Users Information Manual", R86610 (Rev. A 8-06), (Aug. 2006), 16 pgs.

(Continued)

*Primary Examiner* — Cassey D Bauer
(74) *Attorney, Agent, or Firm* — Schwegman Lundberg & Woessner, P.A.

(57) ABSTRACT

A liquid to air membrane energy exchanger (LAMEE) can be used as part of a heating and cooling system to transfer heat and moisture between a liquid desiccant and an air stream to condition the temperature and humidity of the air flowing through the LAMEE. The membrane can be a non-porous film having selective permeability for water, but not for other constituents that form the liquid desiccant. The non-porous membrane can allow for use of liquid desiccants, such as glycols, that had been previously determined to be unacceptable or undesirable in these types of applications. In an example, the membrane can be an ion-exchange membrane or pervaporation membrane.

24 Claims, 5 Drawing Sheets

(51) Int. Cl.
  *F24F 12/00* (2006.01)
  *F24F 3/147* (2006.01)

(56) References Cited

U.S. PATENT DOCUMENTS

| | | |
|---|---|---|
| 2,290,465 A | 7/1942 | Crawford et al. |
| 2,562,811 A | 7/1951 | Muffly |
| 2,946,201 A | 7/1960 | Munters |
| 2,968,165 A | 1/1961 | Norback |
| 3,009,684 A | 11/1961 | Munters |
| 3,018,231 A | 1/1962 | Valentine et al. |
| 3,144,901 A | 8/1964 | Meek |
| 3,247,679 A | 4/1966 | Gershon |
| 3,291,206 A | 12/1966 | Nicholson |
| 3,401,530 A | 9/1968 | Gershon |
| 3,467,072 A | 9/1969 | Toesca |
| 3,735,559 A | 5/1973 | Salemme |
| 4,011,731 A | 3/1977 | Meckler |
| 4,113,004 A | 9/1978 | Rush et al. |
| 4,180,985 A | 1/1980 | Northrup, Jr. |
| 4,233,796 A | 11/1980 | Mazzoni et al. |
| 4,235,081 A | 11/1980 | Dowling |
| 4,257,169 A | 3/1981 | Pierce |
| 4,259,849 A | 4/1981 | Griffiths |
| 4,373,347 A | 2/1983 | Howell et al. |
| 4,380,910 A | 4/1983 | Hood et al. |
| 4,430,864 A | 2/1984 | Mathiprakasam |
| 4,474,021 A | 10/1984 | Harband |
| 4,538,426 A | 9/1985 | Bock |
| 4,594,860 A | 6/1986 | Coellner et al. |
| 4,691,530 A | 9/1987 | Meckler |
| 4,700,550 A | 10/1987 | Rhodes |
| 4,719,761 A | 1/1988 | Cromer |
| 4,723,417 A | 2/1988 | Meckler |
| 4,729,428 A | 3/1988 | Yasutake et al. |
| 4,841,733 A | 6/1989 | Dussault et al. |
| 4,887,438 A | 12/1989 | Meckler |
| 4,900,448 A | 2/1990 | Bonne et al. |
| 4,905,479 A | 3/1990 | Wilkinson |
| 4,909,810 A | 3/1990 | Nakao et al. |
| 4,930,322 A | 6/1990 | Ashley et al. |
| 4,936,107 A | 6/1990 | Kitagaki et al. |
| 4,939,906 A | 7/1990 | Spatz et al. |
| 4,941,324 A | 7/1990 | Peterson et al. |
| 4,982,575 A | 1/1991 | Besik |
| 5,003,961 A | 4/1991 | Besik |
| 5,020,334 A | 6/1991 | Wilkinson |
| 5,020,335 A | 6/1991 | Albers et al. |
| 5,022,241 A | 6/1991 | Wilkinson |
| 5,120,445 A | 6/1992 | Colman |
| 5,131,238 A | 7/1992 | Meckler |
| 5,148,374 A | 9/1992 | Coellner |
| 5,170,633 A | 12/1992 | Kaplan |
| 5,176,005 A | 1/1993 | Kaplan |
| 5,181,387 A | 1/1993 | Meckler |
| 5,191,771 A | 3/1993 | Meckler |
| 5,297,398 A | 3/1994 | Meckler |
| 5,311,929 A | 5/1994 | Verret |
| 5,325,676 A | 7/1994 | Meckler |
| 5,351,497 A | 10/1994 | Lowenstein |
| 5,353,606 A | 10/1994 | Yoho et al. |
| 5,373,704 A | 12/1994 | Mcfadden |
| 5,387,376 A | 2/1995 | Gasser |
| 5,448,895 A | 9/1995 | Coellner et al. |
| 5,471,852 A | 12/1995 | Meckler |
| 5,482,625 A | 1/1996 | Shimizu et al. |
| 5,496,397 A | 3/1996 | Fischer et al. |
| 5,502,975 A | 4/1996 | Brickley et al. |
| 5,517,828 A | 5/1996 | Calton et al. |
| 5,526,651 A | 6/1996 | Worek et al. |
| 5,542,968 A | 8/1996 | Belding et al. |
| 5,551,245 A | 9/1996 | Calton et al. |
| 5,564,281 A | 10/1996 | Calton et al. |
| 5,579,647 A | 12/1996 | Calton et al. |
| 5,580,369 A | 12/1996 | Belding et al. |
| 5,632,954 A | 5/1997 | Coellner et al. |
| 5,638,900 A | 6/1997 | Lowenstein et al. |
| 5,649,428 A | 7/1997 | Calton et al. |
| 5,650,221 A | 7/1997 | Belding et al. |
| 5,653,115 A | 8/1997 | Brickley et al. |
| 5,660,048 A | 8/1997 | Belding et al. |
| 5,661,983 A | 9/1997 | Groten et al. |
| 5,685,897 A | 11/1997 | Belding et al. |
| 5,701,762 A | 12/1997 | Akamatsu et al. |
| 5,718,286 A | 2/1998 | Damsohn et al. |
| 5,727,394 A | 3/1998 | Belding et al. |
| 5,732,562 A | 3/1998 | Moratalla |
| 5,749,230 A | 5/1998 | Coellner et al. |
| 5,758,508 A | 6/1998 | Belding et al. |
| 5,758,511 A | 6/1998 | Yoho et al. |
| 5,761,915 A | 6/1998 | Rao |
| 5,761,923 A | 6/1998 | Maeda |
| 5,791,153 A | 8/1998 | Belding et al. |
| 5,791,157 A | 8/1998 | Maeda |
| 5,816,065 A | 10/1998 | Maeda |
| 5,825,641 A | 10/1998 | Mangtani |
| 5,826,434 A | 10/1998 | Belding et al. |
| 5,826,641 A | 10/1998 | Bierwirth et al. |
| 5,832,736 A | 11/1998 | Yoshioka et al. |
| 5,860,284 A | 1/1999 | Goland et al. |
| 5,890,372 A | 4/1999 | Belding et al. |
| 5,911,273 A | 6/1999 | Brenner et al. |
| 5,931,016 A | 8/1999 | Yoho |
| 5,943,874 A | 8/1999 | Maeda |
| 5,946,931 A | 9/1999 | Lomax et al. |
| 5,950,447 A | 9/1999 | Maeda et al. |
| 5,992,160 A | 11/1999 | Bussjager et al. |
| 6,003,327 A | 12/1999 | Belding et al. |
| 6,018,953 A | 2/2000 | Belding et al. |
| 6,018,954 A | 2/2000 | Assaf |
| 6,029,462 A | 2/2000 | Denniston |
| 6,029,467 A | 2/2000 | Moratalla |
| 6,050,100 A | 4/2000 | Belding et al. |
| 6,079,481 A | 6/2000 | Lowenstein et al. |
| 6,094,835 A | 8/2000 | Cromer |
| 6,138,470 A | 10/2000 | Potnis et al. |
| 6,141,979 A | 11/2000 | Dunlap |
| 6,145,588 A | 11/2000 | Martin et al. |
| 6,156,102 A | 12/2000 | Conrad et al. |
| 6,176,101 B1 | 1/2001 | Lowenstein |
| 6,178,762 B1 | 1/2001 | Flax |
| 6,199,388 B1 | 3/2001 | Fischer |
| 6,237,354 B1 | 5/2001 | Cromer |
| 6,269,650 B1 | 8/2001 | Shaw |
| 6,318,106 B1 | 11/2001 | Maeda |
| RE37,464 E | 12/2001 | Meckler |
| 6,363,218 B1 | 3/2002 | Lowenstein et al. |
| 6,412,295 B2 | 7/2002 | Weiss et al. |
| 6,442,951 B1 | 9/2002 | Maeda et al. |
| 6,494,053 B1 | 12/2002 | Forkosh |
| 6,497,107 B2 | 12/2002 | Maisotsenko et al. |
| 6,532,763 B1 | 3/2003 | Gupte |
| 6,546,746 B2 | 4/2003 | Forkosh et al. |
| 6,568,466 B2 | 5/2003 | Lowenstein et al. |
| 6,575,228 B1 | 6/2003 | Ragland et al. |
| 6,598,862 B2 | 7/2003 | Merrill et al. |
| 6,635,104 B2 | 10/2003 | Komkova et al. |
| 6,644,059 B2 | 11/2003 | Maeda et al. |
| 6,684,649 B1 | 2/2004 | Thompson |
| 6,709,492 B1 | 3/2004 | Spadaccini et al. |
| 6,720,990 B1 | 4/2004 | Walker et al. |
| 6,739,142 B2 | 5/2004 | Korin |
| 6,745,826 B2 | 6/2004 | Lowenstein et al. |
| 6,751,964 B2 | 6/2004 | Fischer |
| 6,800,118 B2 | 10/2004 | Kusunose et al. |
| 6,841,601 B2 | 1/2005 | Serpico et al. |
| 6,848,265 B2 | 2/2005 | Lowenstein et al. |
| 6,854,278 B2 | 2/2005 | Maisotsenko et al. |
| 6,864,005 B2 | 3/2005 | Mossman |
| 6,935,416 B1 | 8/2005 | Tsunoda et al. |
| 6,973,795 B1 | 12/2005 | Moffitt |
| 6,976,365 B2 | 12/2005 | Forkosh et al. |
| 6,978,633 B2 | 12/2005 | Yamazaki |
| 7,000,427 B2 | 2/2006 | Mathias et al. |

(56) References Cited

U.S. PATENT DOCUMENTS

| | | | |
|---|---|---|---|
| 7,017,356 B2 | 3/2006 | Moffitt |
| 7,092,006 B2 | 8/2006 | Walker et al. |
| 7,093,452 B2 | 8/2006 | Chee et al. |
| 7,093,649 B2 | 8/2006 | Dawson |
| RE39,288 E | 9/2006 | Assaf |
| 7,178,355 B2 | 2/2007 | Moffitt |
| 7,181,918 B2 | 2/2007 | Reinders et al. |
| 7,269,966 B2 | 9/2007 | Lowenstein et al. |
| 7,306,650 B2 | 12/2007 | Slayzak et al. |
| 7,331,376 B2 | 2/2008 | Gagnon et al. |
| 7,340,906 B2 | 3/2008 | Moffitt |
| 7,389,646 B2 | 6/2008 | Moffitt |
| 7,389,652 B1 | 6/2008 | Fair |
| 7,593,033 B2 | 9/2009 | Walker et al. |
| 7,602,414 B2 | 10/2009 | Walker et al. |
| 7,605,840 B2 | 10/2009 | Walker et al. |
| 7,717,404 B2 | 5/2010 | Hasegawa et al. |
| 7,719,565 B2 | 5/2010 | Walker et al. |
| 7,737,224 B2 | 6/2010 | Willis et al. |
| 7,753,991 B2 | 7/2010 | Kertzman |
| 7,781,034 B2 | 8/2010 | Yializis et al. |
| 7,817,182 B2 | 10/2010 | Walker et al. |
| 7,942,387 B2 | 5/2011 | Forkosh |
| 7,966,841 B2 | 6/2011 | Lowenstein et al. |
| 8,002,023 B2 | 8/2011 | Murayama |
| 8,033,532 B2 | 10/2011 | Yabu |
| 8,137,436 B2 | 3/2012 | Calis et al. |
| 8,157,891 B2 | 4/2012 | Montie et al. |
| 8,318,824 B2 | 11/2012 | Matsuoka et al. |
| 8,511,074 B2 | 8/2013 | Kuehnel et al. |
| 8,550,151 B2 | 10/2013 | Murayama et al. |
| 8,769,971 B2 | 7/2014 | Kozubal et al. |
| 8,783,053 B2 | 7/2014 | McCann |
| 8,887,523 B2 | 11/2014 | Gommed et al. |
| 8,899,061 B2 | 12/2014 | Reytblat |
| 8,920,699 B2 | 12/2014 | Marutani et al. |
| 8,943,848 B2 | 2/2015 | Phannavong et al. |
| 8,966,924 B2 | 3/2015 | Pichai |
| 9,027,764 B2 | 5/2015 | Marutani et al. |
| 9,109,808 B2 | 8/2015 | Gerber et al. |
| 9,188,349 B2 | 11/2015 | Warmerdam et al. |
| 9,234,665 B2 | 1/2016 | Erb et al. |
| 9,243,810 B2 | 1/2016 | Vandermeulen et al. |
| 9,273,877 B2 | 3/2016 | Vandermeulen |
| 9,429,332 B2 | 8/2016 | Vandermeulen et al. |
| 9,810,439 B2 * | 11/2017 | Coutu ................ F24F 3/1417 |
| 9,816,760 B2 | 11/2017 | LePoudre et al. |
| 9,909,768 B2 | 3/2018 | Gerber et al. |
| 10,302,317 B2 | 5/2019 | Besant et al. |
| 10,352,628 B2 | 7/2019 | Erb et al. |
| 10,480,801 B2 | 11/2019 | Gerber et al. |
| 10,584,884 B2 | 3/2020 | Coutu et al. |
| 2001/0003902 A1 | 6/2001 | Kopko |
| 2002/0005271 A1 | 1/2002 | Weiss et al. |
| 2002/0038552 A1 | 4/2002 | Maisotsenko |
| 2002/0158023 A1 | 10/2002 | Wurzburger |
| 2003/0014983 A1 | 1/2003 | Maisotsenko et al. |
| 2003/0037905 A1 | 2/2003 | Weng |
| 2003/0070787 A1 | 4/2003 | Moffitt |
| 2003/0121271 A1 | 7/2003 | Dinnage et al. |
| 2003/0132166 A1 | 7/2003 | Rey |
| 2004/0000152 A1 | 1/2004 | Fischer |
| 2004/0055329 A1 | 3/2004 | Mathias et al. |
| 2004/0061245 A1 | 4/2004 | Maisotsenko et al. |
| 2004/0134212 A1 | 7/2004 | Lee et al. |
| 2004/0168462 A1 | 9/2004 | Assaf |
| 2004/0226685 A1 | 11/2004 | Gagnon et al. |
| 2005/0056042 A1 | 3/2005 | Bourne et al. |
| 2005/0072303 A1 | 4/2005 | Weidenmann |
| 2005/0230080 A1 | 10/2005 | Paul et al. |
| 2005/0249901 A1 | 11/2005 | Yializis et al. |
| 2005/0279115 A1 | 12/2005 | Lee et al. |
| 2006/0021615 A1 | 2/2006 | Kertzman |
| 2006/0042295 A1 | 3/2006 | Assaf |
| 2006/0205301 A1 | 9/2006 | Klare et al. |
| 2007/0029685 A1 | 2/2007 | Lin |
| 2007/0056894 A1 | 3/2007 | Connors, Jr. |
| 2007/0068663 A1 | 3/2007 | Thomer et al. |
| 2007/0234743 A1 | 10/2007 | Assaf |
| 2007/0279861 A1 | 12/2007 | Doll et al. |
| 2008/0023182 A1 | 1/2008 | Beamer et al. |
| 2008/0066888 A1 | 3/2008 | Tong et al. |
| 2008/0085437 A1 | 4/2008 | Dean et al. |
| 2008/0099184 A1 | 5/2008 | Han |
| 2008/0283217 A1 | 11/2008 | Gagnon et al. |
| 2009/0095162 A1 | 4/2009 | Hargis et al. |
| 2009/0126913 A1 | 5/2009 | Lee et al. |
| 2009/0133866 A1 | 5/2009 | Campbell et al. |
| 2009/0193974 A1 | 8/2009 | Montie et al. |
| 2009/0211977 A1 | 8/2009 | Miller |
| 2009/0294110 A1 | 12/2009 | Foust |
| 2009/0324929 A1 | 12/2009 | Yamakawa et al. |
| 2010/0090356 A1 | 4/2010 | Sines et al. |
| 2010/0170776 A1 | 7/2010 | Ehrenberg et al. |
| 2010/0181062 A1 | 7/2010 | Mccann |
| 2010/0192605 A1 | 8/2010 | Fang et al. |
| 2010/0200068 A1 | 8/2010 | D'arcy et al. |
| 2010/0275629 A1 | 11/2010 | Erickson |
| 2010/0300123 A1 | 12/2010 | Park et al. |
| 2010/0319370 A1 | 12/2010 | Kozubal et al. |
| 2010/0326914 A1 | 12/2010 | Drost et al. |
| 2011/0056384 A1 | 3/2011 | Kadota |
| 2011/0192579 A1 | 8/2011 | Sotokawa et al. |
| 2011/0223486 A1 | 9/2011 | Zhang et al. |
| 2011/0232485 A1 | 9/2011 | Ellsworth |
| 2011/0232633 A1 | 9/2011 | Lima |
| 2011/0259572 A1 | 10/2011 | Muratani et al. |
| 2011/0308265 A1 | 12/2011 | Phannavong et al. |
| 2012/0000227 A1 | 1/2012 | Matsuura et al. |
| 2012/0031133 A1 | 2/2012 | Kuwabara et al. |
| 2012/0061045 A1 * | 3/2012 | Huizing ................ B01D 53/268 165/10 |
| 2012/0073791 A1 * | 3/2012 | Dubois ................ B01D 53/228 165/138 |
| 2012/0085112 A1 | 4/2012 | Wintemute |
| 2012/0106073 A1 | 5/2012 | Wu et al. |
| 2012/0125020 A1 | 5/2012 | Vandermeulen et al. |
| 2012/0125021 A1 | 5/2012 | Vandermeulen et al. |
| 2012/0125023 A1 | 5/2012 | Kopko et al. |
| 2012/0125031 A1 | 5/2012 | Vandermeulen et al. |
| 2012/0125405 A1 | 5/2012 | Vandermeulen et al. |
| 2012/0125581 A1 | 5/2012 | Allen et al. |
| 2012/0131934 A1 | 5/2012 | Vandermeulen et al. |
| 2012/0131937 A1 | 5/2012 | Vandermeulen et al. |
| 2012/0131938 A1 | 5/2012 | Vandermeulen et al. |
| 2012/0131939 A1 | 5/2012 | Vandermeulen et al. |
| 2012/0131940 A1 | 5/2012 | Vandermeulen et al. |
| 2012/0132513 A1 | 5/2012 | Vandermeulen et al. |
| 2012/0162918 A1 | 6/2012 | Thyni et al. |
| 2012/0168369 A1 | 7/2012 | Van Medevoort et al. |
| 2012/0186281 A1 | 7/2012 | Vandermeulen et al. |
| 2012/0247132 A1 | 10/2012 | Lakdawala et al. |
| 2012/0298340 A1 | 11/2012 | Al-Otaibi |
| 2013/0056177 A1 | 3/2013 | Coutu et al. |
| 2013/0186121 A1 | 7/2013 | Erb et al. |
| 2013/0199220 A1 | 8/2013 | Ma et al. |
| 2013/0240438 A1 | 9/2013 | Willis et al. |
| 2013/0248147 A1 | 9/2013 | Wintemute et al. |
| 2013/0283837 A1 | 10/2013 | Takahashi et al. |
| 2013/0340449 A1 | 12/2013 | Kozubal et al. |
| 2014/0054004 A1 | 2/2014 | LePoudre et al. |
| 2014/0054013 A1 | 2/2014 | LePoudre et al. |
| 2014/0083648 A1 | 3/2014 | Wawryk |
| 2014/0190037 A1 | 7/2014 | Erb et al. |
| 2014/0245769 A1 | 9/2014 | Vandermeulen et al. |
| 2014/0260367 A1 | 9/2014 | Coutu et al. |
| 2014/0260369 A1 | 9/2014 | Lepoudre et al. |
| 2014/0260373 A1 | 9/2014 | Gerber et al. |
| 2014/0260399 A1 | 9/2014 | Vandermeulen |
| 2014/0262125 A1 | 9/2014 | Erb et al. |
| 2014/0262144 A1 | 9/2014 | Erb et al. |
| 2014/0326433 A1 | 11/2014 | Kozubal |
| 2015/0096714 A1 | 4/2015 | Dagley |
| 2015/0184876 A1 | 7/2015 | Vandermeulen et al. |

(56) References Cited

U.S. PATENT DOCUMENTS

| | | |
|---|---|---|
| 2015/0292754 A1 | 10/2015 | Mongar |
| 2015/0323203 A1 | 11/2015 | Gerber et al. |
| 2016/0084512 A1 | 3/2016 | Erb et al. |
| 2016/0187010 A1 | 6/2016 | Vandermeulen |
| 2016/0290666 A1 | 10/2016 | Coutu et al. |
| 2016/0298865 A1 | 10/2016 | Gerber et al. |
| 2016/0327345 A1 | 11/2016 | Lowenstein |
| 2017/0241655 A1 | 8/2017 | Lepoudre et al. |
| 2018/0073753 A1 | 3/2018 | Lepoudre et al. |
| 2018/0128510 A1 | 5/2018 | Lepoudre et al. |
| 2018/0135880 A1 | 5/2018 | Ghadiri Moghaddam et al. |
| 2018/0187918 A1 | 7/2018 | Lepoudre et al. |
| 2019/0212020 A1 | 7/2019 | Besant et al. |
| 2019/0346212 A1 | 11/2019 | Norman Erb et al. |

FOREIGN PATENT DOCUMENTS

| | | |
|---|---|---|
| AU | 2014231672 B2 | 3/2018 |
| AU | 2015230799 B2 | 3/2018 |
| AU | 2013305427 B2 | 4/2018 |
| AU | 2014231681 B2 | 6/2018 |
| AU | 2013305428 B2 | 9/2018 |
| AU | 2014231668 B2 | 2/2019 |
| AU | 2014231667 B2 | 6/2019 |
| AU | 2017204552 | 7/2019 |
| CA | 2283089 A1 | 11/2000 |
| CA | 2801352 A | 12/2011 |
| CA | 2801352 A1 | 12/2011 |
| CA | 2798928 A1 | 2/2012 |
| CA | 2843763 A1 | 3/2013 |
| CA | 2904224 A1 | 9/2014 |
| CA | 2901483 C | 4/2019 |
| CH | 193732 A | 10/1937 |
| CN | 1163389 A | 10/1997 |
| CN | 1343292 A | 4/2002 |
| CN | 1456855 A | 11/2003 |
| CN | 1517610 A | 8/2004 |
| CN | 1518477 A | 8/2004 |
| CN | 1666081 A | 9/2005 |
| CN | 1711448 A | 12/2005 |
| CN | 2821506 Y | 9/2006 |
| CN | 200958820 Y | 10/2007 |
| CN | 101368754 A | 2/2009 |
| CN | 101405559 A | 4/2009 |
| CN | 101421580 A | 4/2009 |
| CN | 101469090 A | 7/2009 |
| CN | 101776406 A | 7/2010 |
| CN | 101900385 | 12/2010 |
| CN | 101918777 A | 12/2010 |
| CN | 102076401 A | 5/2011 |
| CN | 201906567 U | 7/2011 |
| CN | 102165268 A | 8/2011 |
| CN | 102232015 A | 11/2011 |
| CN | 102345909 A | 2/2012 |
| CN | 102395419 A | 3/2012 |
| CN | 102548727 A | 7/2012 |
| CN | 102549361 A | 7/2012 |
| CN | 102713154 A | 10/2012 |
| CN | 102933931 A | 2/2013 |
| CN | 102939397 A | 2/2013 |
| CN | 103068246 A | 4/2013 |
| CN | 103069246 A | 4/2013 |
| CN | 103827595 A | 5/2014 |
| CN | 104048434 A | 9/2014 |
| CN | 203893703 U | 10/2014 |
| CN | 104136855 A | 11/2014 |
| CN | 104583706 A | 4/2015 |
| CN | 105121989 A | 12/2015 |
| CN | 105164474 A | 12/2015 |
| CN | 105283715 A | 1/2016 |
| CN | 101512238 A | 8/2016 |
| CN | 105164484 B | 6/2017 |
| CN | 105121989 B | 9/2017 |
| CN | 107249715 A | 10/2017 |
| CN | 107300230 A | 10/2017 |
| CN | 107560482 A | 1/2018 |
| CN | 107850335 A | 3/2018 |
| CN | 107923647 A | 4/2018 |
| CN | 108027221 A | 5/2018 |
| CN | 109028519 A | 12/2018 |
| CN | 109073265 A | 12/2018 |
| CN | 110345803 A | 10/2019 |
| DE | 10143092 A1 | 3/2003 |
| EP | 0448991 A2 | 10/1991 |
| EP | 0661502 A2 | 7/1995 |
| EP | 0678321 A2 | 10/1995 |
| EP | 1108575 A1 | 6/2001 |
| EP | 2751493 B1 | 3/2018 |
| EP | 3314188 A1 | 5/2018 |
| EP | 2893283 B1 | 12/2018 |
| EP | 2972039 B1 | 12/2018 |
| EP | 2971993 B1 | 8/2019 |
| EP | 2971992 | 1/2020 |
| FR | 2291457 A1 | 6/1976 |
| GB | 1354502 A | 6/1974 |
| IN | 201717044889 A | 3/2018 |
| IN | 201717044890 A | 3/2018 |
| IN | 201817002765 A | 4/2018 |
| IN | 201817037404 A | 12/2018 |
| JP | 61-52594 A | 3/1986 |
| JP | 05-157282 A | 6/1993 |
| JP | H09113167 A | 5/1997 |
| JP | 09-196482 A | 7/1997 |
| JP | 10-170177 A | 6/1998 |
| JP | 2004116419 A | 4/2004 |
| JP | 2008-070046 A | 3/2008 |
| JP | 2009-275955 A | 11/2009 |
| JP | 4870843 | 11/2011 |
| KR | 20110092773 | 8/2011 |
| SG | 10201809840VA | 12/2018 |
| TW | I271499 B | 1/2007 |
| WO | WO-96/041107 A1 | 12/1996 |
| WO | WO-99/014535 A1 | 3/1999 |
| WO | WO-01/35039 A1 | 5/2001 |
| WO | WO-03/049835 A1 | 6/2003 |
| WO | WO-2004/065875 A1 | 8/2004 |
| WO | WO-2005100243 A1 | 10/2005 |
| WO | WO-2008/037079 A1 | 4/2008 |
| WO | WO-2008/053367 A2 | 5/2008 |
| WO | WO-2008/089484 A1 | 7/2008 |
| WO | WO-2009/094032 A1 | 7/2009 |
| WO | WO-2009/158030 A1 | 12/2009 |
| WO | WO-2010006968 A1 | 1/2010 |
| WO | WO-2011/062808 A1 | 5/2011 |
| WO | WO-2011/161547 A2 | 12/2011 |
| WO | WO-2011/161547 A3 | 12/2011 |
| WO | WO-2012/018089 A1 | 2/2012 |
| WO | WO-2012/042553 A1 | 4/2012 |
| WO | WO-2012050860 A1 | 4/2012 |
| WO | WO-2012/087273 A1 | 6/2012 |
| WO | WO-2012167366 A1 | 12/2012 |
| WO | WO-2013/029148 A1 | 3/2013 |
| WO | WO-2013/094206 A1 | 6/2013 |
| WO | WO-2013/107554 A1 | 7/2013 |
| WO | WO-2013/192397 A1 | 12/2013 |
| WO | WO-2014/029003 A1 | 2/2014 |
| WO | WO-2014/029004 A1 | 2/2014 |
| WO | WO-2014/107790 A1 | 7/2014 |
| WO | WO-2014/138847 A1 | 9/2014 |
| WO | WO-2014/138859 A1 | 9/2014 |
| WO | WO-2014/138860 A1 | 9/2014 |
| WO | WO-2014138846 A1 | 9/2014 |
| WO | WO-2014138851 A1 | 9/2014 |
| WO | WO-2014142277 A1 | 9/2014 |
| WO | WO-2016/026042 A1 | 2/2016 |
| WO | WO-2017152268 A1 | 9/2017 |

OTHER PUBLICATIONS

"Advances in Desiccant-Based Dehumidification", (C) 2005 American Standard, TRANE Engineers Newsletter; vol. 34-4, (2005), 1-8.

"U.S. Appl. No. 10/048,797, Amendment and Response filed Apr. 29, 2003 to Non-Final Office dated Mar. 11, 2003", 10 pgs.

(56) References Cited

OTHER PUBLICATIONS

"U.S. Appl. No. 10/048,797, Non-Final Office dated Mar. 11, 2003", 4 pgs.
"U.S. Appl. No. 10/048,797, Notice of Allowance dated May 13, 2003", 5 pgs.
"U.S. Appl. No. 13/449,598, Final Office Action dated Feb. 4, 2016", 23 pgs.
"U.S. Appl. No. 13/449,598, Non Final Office Action dated Apr. 24, 2015", 18 pgs.
"U.S. Appl. No. 13/449,598, Non Final Office Action dated Aug. 27, 2015", 20 pgs.
"U.S. Appl. No. 13/449,598, Notice of Allowance dated Mar. 10, 2017", 7 pgs.
"U.S. Appl. No. 13/449,598, Notice of Allowance dated Nov. 4, 2016", 9 pgs.
"U.S. Appl. No. 13/449,598, Response filed Jan. 29, 2015 to Restriction Requirement mailed Jan. 5, 2015", 2 pgs.
"U.S. Appl. No. 13/449,598, Response filed Jul. 17, 2015 to Non Final Office Action dated Apr. 24, 2015", 17 pgs.
"U.S. Appl. No. 13/449,598, Response filed Nov. 16, 2015 to Non Final Office Action dated Aug. 27, 2015", 18 pgs.
"U.S. Appl. No. 13/449,598, Restriction Requirement dated Jan. 5, 2015", 10 pgs.
"U.S. Appl. No. 13/702,596, Appeal Brief filed Jun. 15, 2015", 82 pgs.
"U.S. Appl. No. 13/702,596, Final Office Action dated Jan. 30, 2015", 15 pgs.
"U.S. Appl. No. 13/702,596, Non Final Office Action dated Oct. 30, 2014", 16 pgs.
"U.S. Appl. No. 13/702,596, Notice of Allowance dated Oct. 1, 2015", 7 pgs.
"U.S. Appl. No. 13/702,596, Notice of Allowance dated Nov. 25, 2015", 2 pgs.
"U.S. Appl. No. 13/702,596, Post Allowance Amendment filed Oct. 7, 2015", 13 pgs.
"U.S. Appl. No. 13/702,596, PTO Response to Rule 312 Communication dated Oct. 19, 2015", 2 pgs.
"U.S. Appl. No. 13/702,596, Response filed Dec. 15, 2014 to Non Final Office Action dated Oct. 30, 2014", 21 pgs.
"U.S. Appl. No. 13/797,062, Appeal Brief filed Jun. 9, 2016", 33 pgs.
"U.S. Appl. No. 13/797,062, Final Office Action dated Feb. 24, 2016", 29 pgs.
"U.S. Appl. No. 13/797,062, Non Final Office Action dated May 7, 2015", 19 pgs.
"U.S. Appl. No. 13/797,062, Non Final Office Action dated Sep. 25, 2015", 24 pgs.
"U.S. Appl. No. 13/797,062, Response filed Apr. 23, 2015 to Restriction Requirement dated Mar. 13, 2015", 3 pgs.
"U.S. Appl. No. 13/797,062, Response filed Jul. 17, 2015 to Non Final Office Action dated May 7, 2015", 16 pgs.
"U.S. Appl. No. 13/797,062, Response filed Nov. 30, 2015 to Non Final Office Action dated Sep. 25, 2015", 16 pgs.
"U.S. Appl. No. 13/797,062, Restriction Requirement dated Mar. 13, 2015", 8 pgs.
"U.S. Appl. No. 13/797,152, Appeal Brief filed Jun. 9, 2016", 29 pgs.
"U.S. Appl. No. 13/797,152, Corrected Notice of Allowance dated Mar. 9, 2017", 7 pgs.
"U.S. Appl. No. 13/797,152, Final Office Action dated Feb. 25, 2016", 14 pgs.
"U.S. Appl. No. 13/797,152, Non Final Office Action dated Aug. 25, 2015", 10 pgs.
"U.S. Appl. No. 13/797,152, Notice of Allowance dated Mar. 9, 2017", 7 pgs.
"U.S. Appl. No. 13/797,152, Notice of Allowance dated Oct. 31, 2016", 7 pgs.
"U.S. Appl. No. 13/797,152, Response filed Nov. 20, 2015 to Non Final Office Action dated Aug. 25, 2015", 12 pgs.
"U.S. Appl. No. 13/801,280, 312 Amendment filed Jun. 18, 2015", 8 pgs.
"U.S. Appl. No. 13/801,280, Non Final Office Action dated Feb. 12, 2015", 7 pgs.
"U.S. Appl. No. 13/801,280, Notice of Allowance dated May 19, 2015", 7 pgs.
"U.S. Appl. No. 13/801,280, PTO Response to 312 Amendment dated Jul. 9, 2015", 2 pgs.
"U.S. Appl. No. 13/801,280, Response filed Jan. 7, 2015 to Restriction Requirement dated Dec. 10, 2014", 1 pg.
"U.S. Appl. No. 13/801,280, Response filed Mar. 31, 2015 to Non Final Office Action dated Feb. 12, 2015", 9 pgs.
"U.S. Appl. No. 13/801,280, Restriction Requirement dated Dec. 10, 2014", 9 pgs.
"U.S. Appl. No. 14/171,951, Advisory Action dated Nov. 10, 2016", 3 pgs.
"U.S. Appl. No. 14/171,951, Final Office Action dated Jun. 28, 2016", 36 pgs.
"U.S. Appl. No. 14/171,951, Non Final Office Action dated Jan. 5, 2016", 20 pgs.
"U.S. Appl. No. 14/171,951, Non Final Office Action dated May 2, 2016", 35 pgs.
"U.S. Appl. No. 14/171,951, Notice of Allowance dated Feb. 3, 2017", 5 pgs.
"U.S. Appl. No. 14/171,951, Response filed Mar. 28, 2016 to Non Final Office Action dated Jan. 5, 2016", 18 pgs.
"U.S. Appl. No. 14/171,951, Response filed Jun. 9, 2016 to Non Final Office Action dated May 2, 2016", 24 pgs.
"U.S. Appl. No. 14/171,951, Response filed Oct. 28, 2016 to Final Office Action dated Jun. 28, 2016", 15 pgs.
"U.S. Appl. No. 14/171,951, Response filed Dec. 3, 2015 to Restriction Requirement dated Nov. 16, 2015", 6 pgs.
"U.S. Appl. No. 14/171,951, Response filed Dec. 15, 2016 to Advisory Action dated Nov. 10, 2016", 16 pgs.
"U.S. Appl. No. 14/171,951, Restriction Requirement dated Nov. 16, 2015", 13 pgs.
"U.S. Appl. No. 14/187,413, Advisory Action dated Nov. 10, 2016", 4 pgs.
"U.S. Appl. No. 14/187,413, Final Office Action dated Jul. 28, 2016", 20 pgs.
"U.S. Appl. No. 14/187,413, Non Final Office Action dated Feb. 8, 2017", 15 pgs.
"U.S. Appl. No. 14/187,413, Non Final Office Action dated Mar. 17, 2016", 15 pgs.
"U.S. Appl. No. 14/187,413, Response filed Feb. 25, 2015 to Restriction Requirement dated Feb. 16, 2016", 3 pgs.
"U.S. Appl. No. 14/187,413, Response filed May 26, 2016 to Non Final Office Action dated Mar. 17, 2016", 15 pgs.
"U.S. Appl. No. 14/187,413, Response filed Oct. 28, 2016 to Final Office Action dated Jul. 28, 2016", 17 pgs.
"U.S. Appl. No. 14/187,413, Response filed Dec. 21, 2016 to Final Office Action dated Jul. 28, 2016 and Advisory Action dated Nov. 10, 2016", 15 pgs.
"U.S. Appl. No. 14/187,413, Restriction Requirement dated Feb. 16, 2016", 6 pgs.
"U.S. Appl. No. 14/190,715, Restriction Requirement dated Apr. 13, 2017", 7 pgs.
"U.S. Appl. No. 14/804,953, Non Final Office Action dated Sep. 15, 2016", 8 pgs.
"U.S. Appl. No. 14/804,953, Notice of Allowance dated Feb. 27, 2017", 7 pgs.
"U.S. Appl. No. 14/804,953, Response filed Dec. 15, 2016 to Non Final Office Action dated Sep. 15, 2016", 7 pgs.
"U.S. Appl. No. 14/957,795, Non Final Office Action dated Apr. 3, 2017", 19 pgs.
"Ashrae Technical Committee", Meeting Programs, (Jan. 29, 1997), 13 pgs.
"Australian Application Serial No. 2011268661, First Examiner Report dated Sep. 24, 2014", 5 pgs.
"Australian Application Serial No. 2011268661, Response filed Jul. 20, 2015 to First Examiner Report dated Sep. 24, 2014", 8 pgs.

(56) References Cited

OTHER PUBLICATIONS

"Australian Application Serial No. 2011268661, Response filed Sep. 23, 2015 to Second Examiner Report dated Aug. 18, 2015", 5 pgs.
"Australian Application Serial No. 2011268661, Second Examiner Report dated Aug. 18, 2015", 6 pgs.
"Australian Application Serial No. 2012304223, First Examiner Report dated Aug. 5, 2016", 4 pgs.
"Australian Application Serial No. 2012304223, Response filed Feb. 16, 2017 to First Examiner Report dated Aug. 5, 2016", 25 pgs.
"Australian Application Serial No. 2013305427, Examination Report dated Mar. 3, 2017", 4 pgs.
"Canadian Application Serial No. 2,801,352, Office Action dated Aug. 15, 2016", 3 pgs.
"Canadian Application Serial No. 2,801,352, Response filed Feb. 8, 2017 to Office Action dated Aug. 15, 2016", 89 pgs.
"Canadian Application Serial No. 2,843,763, Office Action dated Dec. 4, 2014", 3 pgs.
"Canadian Application Serial No. 2,843,763, Response filed May 12, 2015 to Office Action dated Dec. 4, 2014", 31 pgs.
"Canadian Application Serial No. 2,901,483, Office Action dated Nov. 23, 2016", 4 pgs.
"Chapter 8—Heating, Ventilating, and Air Conditioning (HVAC) Demonstration", HVAC Demonstration, (published prior to Feb. 21, 2014), 16 pgs.
"Chinese Application Serial No. 201180031103.9, Office Action dated Feb. 11, 2015", (w/ English Translation), 16 pgs.
"Chinese Application Serial No. 201180031103.9, Office Action dated Jun. 13, 2014", (w/ English Translation), 19 pgs.
"Chinese Application Serial No. 201180031103.9, Office Action dated Sep. 9, 2015", (w/ English Translation), 3 pgs.
"Chinese Application Serial No. 201180031103.9, Office Action dated Nov. 6, 2015", (w/ English Translation), 5 pgs.
"Chinese Application Serial No. 201180031103.9, Response filed Apr. 27, 2015 to Office Action dated Feb. 11, 2015", (w/ English Translation), 15 pgs.
"Chinese Application Serial No. 201180031103.9, Response filed Sep. 26, 2014 to Office Action dated Jun. 13, 2014", (w/ English Translation), 12 pgs.
"Chinese Application Serial No. 201180031103.9, Response filed Sep. 29, 2015 to Office Action dated Sep. 9, 2015", (w/ English Translation), 78 pgs.
"Chinese Application Serial No. 201280042778.8, Office Action dated Feb. 3, 2016", (w/ English Translation), 9 pgs.
"Chinese Application Serial No. 201280042778.8, Office Action dated Sep. 7, 2016", 3 pgs.
"Chinese Application Serial No. 201280042778.8, Response filed May 25, 2016 to Office Action dated Feb. 3, 2016", Without English Translation of Claims, 46 pgs.
"Chinese Application Serial No. 201280042778.8, Response filed Nov. 16, 2016 to Office Action dated Sep. 7, 2016", Without English Translation of Claims, 43 pgs.
"Chinese Application Serial No. 201380042926.0, Office Action dated Feb. 26, 2016", (w/ English Translation), 15 pgs.
"Chinese Application Serial No. 201380042926.0, Office Action dated Sep. 28, 2016", (w/ English Translation), 12 pgs.
"Chinese Application Serial No. 201380042926.0, Response filed Feb. 13, 2017 to Office Action dated Sep. 28, 2016", (w/ English Translation of Amended Claims), 56 pgs.
"Chinese Application Serial No. 201380042926.0, Response filed Jul. 7, 2016 to Office Action dated Feb. 26, 2016", (w/ English Translation of Claims), 40 pgs.
"Chinese Application Serial No. 201380044484.3, Office Action dated Jan. 13, 2017", (w/ English Translation), 16 pgs.
"Chinese Application Serial No. 201380044484.3, Office Action dated Mar. 28, 2016", (w/ English Translation), 16 pgs.
"Chinese Application Serial No. 201380044484.3, Response filed Oct. 12, 2016 to Office Action dated Mar. 28, 2016", (w/ English Translation of Claims), 54 pgs.
"Chinese Application Serial No. 201480015355.6, Office Action dated Nov. 28, 2016", (w/ English Translation), 16 pgs.
"Chinese Application Serial No. 201480015422.4, Office Action dated Nov. 1, 2016", (w/ English Translation), 13 pgs.
"Chinese Application Serial No. 201480015766.5, Office Action dated Oct. 19, 2016", (w/ English Translation), 9 pgs.
"Chinese Application Serial No. 201480015766.5, Response filed Jan. 20, 2017 to Office Action dated Oct. 19, 2016", (w/ English Translation of Claims), 52 pgs.
"Dehumidification Solutions", Des Champs Laboratories, Inc., (2001), 18 pgs.
"Desi-Wringer# Precision Desiccant Dehumidification Systems", Des Champs Technologies, (2007), 12 pgs.
"Energy Recovery—Fresh In Air Quality", SEMCO Inc., (published before Apr. 12, 2012), 131 pgs.
"European Application Serial No. 11797695.1, Extended European Search Report dated Jan. 25, 2016", 11 pgs.
"European Application Serial No. 11797695.1, Partial Supplementary European Search Report dated Oct. 7, 2015", 6 pgs.
"European Application Serial No. 11797695.1, Response filed Aug. 22, 2016 to Office Action dated Feb. 11, 2016", 9 pgs.
"European Application Serial No. 12827918.9, Extended European Search Report dated Jul. 6, 2015", 6 pgs.
"European Application Serial No. 12827918.9, Response filed Sep. 28, 2015 to Extended European Search Report dated Jul. 6, 2015", 8 pgs.
"European Application Serial No. 13830357.3, Extended European Search Report dated Jun. 8, 2016", 5 pgs.
"European Application Serial No. 13830357.3, Response filed Dec. 23, 2016 to Extended European Search Report dated Jun. 8, 2016", 11 pgs.
"European Application Serial No. 13830940.6, Extended European Search Report dated Jul. 4, 2016", 5 pgs.
"European Application Serial No. 13830940.6, Response filed Jan. 16, 2017 to Communication Pursuant to Rules 70(2) and 70a(2) EPC dated Jul. 21, 2016", 1 pg.
"European Application Serial No. 14764192.2, Extended European Search Report dated Oct. 27, 2016", 7 pgs.
"European Application Serial No. 14764192.2, Response filed Jan. 30, 2017 to Extended European Search Report dated Oct. 27, 2016", 19 pgs.
"European Application Serial No. 14764192.2, Response filed Apr. 13, 2016 to Communication Pursuant Rules 161(2) and 162 EPC dated Nov. 19, 2015", 9 pgs.
"European Application Serial No. 14764305.0, Extended European Search Report dated Apr. 4, 2017", 8 pgs.
"European Application Serial No. 14764305.0, Response filed Apr. 13, 2016 to Communication Pursuant to Article 94(3) EPC dated Oct. 8, 2015", 10 pgs.
"European Application Serial No. 14764318.3, Extended European Search Report dated Mar. 15, 2017", 10 pgs.
"European Application Serial No. 14764318.3, Response filed Jan. 28, 2016 to Communication pursuant to Rules 161(1) and 162 EPC dated Nov. 19, 2015", 17 pgs.
"European Application Serial No. 14764713.5, Extended European Search Report dated Dec. 9, 2016", 6 pgs.
"European Application Serial No. 14764713.5, Response filed Jan. 28, 2016 to Communication pursuant to Rules 161(1) and 162 EPC dated Dec. 2, 2015", 9 pgs.
"European Application Serial No. 14765396.8, Extended European Search Report dated Oct. 28, 2016", 6 pgs.
"European Application Serial No. 14765396.8, Office Action dated Nov. 20, 2015", 2 pgs.
"European Application Serial No. 14765396.8, Response filed Jan. 29, 2016 to Office Action dated Nov. 20, 2015", 12 pgs.
"International Application Serial No. PCT/CA2012/000749, International Search Report dated Oct. 26, 2012", 3 pgs.
"International Application Serial No. PCT/CA2012/000749, Written Opinion dated Oct. 26, 2012", 5 pgs.
"International Application Serial No. PCT/CA2013/000608, International Preliminary Report on Patentability dated Mar. 5, 2015", 7 pgs.

(56) References Cited

OTHER PUBLICATIONS

"International Application Serial No. PCT/CA2013/000608, International Search Report dated Sep. 23, 2013", 3 pgs.
"International Application Serial No. PCT/CA2013/000608, Written Opinion dated Sep. 23, 2013", 5 pgs.
"International Application Serial No. PCT/CA2013/000609, International Preliminary Report on Patentability dated Mar. 5, 2015", 7 pgs.
"International Application Serial No. PCT/CA2013/000609, International Search Report dated Sep. 17, 2013", 3 pgs.
"International Application Serial No. PCT/CA2013/000609, Written Opinion dated Sep. 17, 2013", 5 pgs.
"International Application Serial No. PCT/CA2013/000964, International Search Report dated Feb. 7, 2014", 3 pgs.
"International Application Serial No. PCT/CA2013/000964, Written Opinion dated Feb. 7, 2014", 6 pgs.
"International Application Serial No. PCT/CA2014/000048, International Preliminary Report on Patentability dated Sep. 24, 2015", 8 pgs.
"International Application Serial No. PCT/CA2014/000048, International Search Report dated Apr. 29, 2014", 3 pgs.
"International Application Serial No. PCT/CA2014/000048, Written Opinion dated Apr. 29, 2014", 6 pgs.
"International Application Serial No. PCT/CA2014/000083, International Preliminary Report on Patentability dated Sep. 24, 2015", 9 pgs.
"International Application Serial No. PCT/CA2014/000083, International Search Report dated May 14, 2014", 3 pgs.
"International Application Serial No. PCT/CA2014/000083, Written Opinion dated May 14, 2014", 7 pgs.
"International Application Serial No. PCT/CA2014/000148, International Preliminary Report on Patentability dated Sep. 24, 2015", 5 pgs.
"International Application Serial No. PCT/CA2014/000148, International Search Report dated May 9, 2014", 4 pgs.
"International Application Serial No. PCT/CA2014/000148, Written Opinion dated May 9, 2014", 3 pgs.
"International Application Serial No. PCT/CA2014/000169, International Preliminary Report on Patentability dated Sep. 24, 2015", 8 pgs.
"International Application Serial No. PCT/CA2014/000169, International Search Report dated May 27, 2014", 3 pgs.
"International Application Serial No. PCT/CA2014/000169, Written Opinion dated May 27, 2014", 6 pgs.
"International Application Serial No. PCT/CA2014/000171, International Preliminary Report on Patentability dated Sep. 24, 2015", 7 pgs.
"International Application Serial No. PCT/CA2014/000171, International Search Report dated May 27, 2014", 3 pgs.
"International Application Serial No. PCT/CA2014/000171, Written Opinion dated May 27, 2014", 5 pgs.
"International Application Serial No. PCT/CA2015/050787, International Search Report dated Nov. 4, 2015", 3 pgs.
"International Application Serial No. PCT/CA2015/050787, Written Opinion dated Nov. 4, 2015", 3 pgs.
"International Application Serial No. PCT/CA2016/050252, International Search Report dated May 26, 2016", 3 pgs.
"International Application Serial No. PCT/CA2016/050252, Written Opinion dated May 26, 2016", 4 pgs.
"International Application Serial No. PCT/CA2016/050507, International Search Report dated Jul. 21, 2016", 3 pgs.
"International Application Serial No. PCT/CA2016/050507, Written Opinion dated Jul. 21, 2016", 3 pgs.
"International Application Serial No. PCT/IB2011/002145, International Preliminary Report on Patentability dated Jan. 10, 2013", 13 pgs.
"International Application Serial No. PCT/IB2011/002145, International Search Report dated Feb. 15, 2012", 7 pgs.
"International Application Serial No. PCT/IB2011/002145, Written Opinion dated Feb. 15, 2012", 11 pgs.
"International Application Serial No. PCT/IB2016/053799, International Search Report dated Aug. 26, 2016", 3 pgs.
"International Application Serial No. PCT/IB2016/053799, Written Opinion dated Aug. 26, 2016", 6 pgs.
"International Application Serial No. PCT/US00/02956, International Preliminary Report on Patentability dated Jul. 9, 2001", 3 pgs.
"International Application Serial No. PCT/US00/02956, International Search Report dated Nov. 8, 2000", 1 pg.
"Two-Wheel Desiccant Dehumidification System—Technology for Dehumidification and Improving Indoor Air Quality", Federal Technology Alert, (Apr. 1997), 24 pgs.
Abdel-Salam, Mohamed R. H., et al., "Experimental Study of Effects of Phase-Change Energy and Operating Parameters on Performances of Two-Fluid and Three-Fluid Liquid-to-Air Membrane Energy Exchangers", ASHRAE Transactions, vol. 122, Part 1, (Jan. 2016), 134-145.
Abdel-Salam, Mohamed R. H., et al., "Performance testing of 2-fluid and 3-fluid liquid-to-air membrane energy exchangers for HVAC applications in cold-dry climates", International Journal of Heat and Mass Transfer, 106, (2017), 558-569.
Abdel-Salam, Mohamed R. H., et al., "Performance testing of a novel 3-fluid liquid-to-air membrane energy exchanger (3-fluid LAMEE) under desiccant solution regeneration operating conditions", International Journal of Heat and Mass Transfer, 95, (2015), 773-786.
Acker, William, "Industrial Dehumidification: Water Vapor Load Calculations And System Descriptions", HPAC Heatina/Pioina/Air Conditionina, (Mar. 1999), 49-59.
Bellia, L., et al., "Air Conditioning Systems With Desiccant Wheel for Italian Climates", International Journal on Architectural Science vol. 1 No. 4, (2000), 193-213.
Bergero, Stefano, et al., "On the performances of a hybrid air-conditioning system in different climatic conditions", Energy 36(8), (2011), 5261-5273.
Bergero, Stefano, et al., "Performance analysis of a liquid desiccant and membrane contactor hybrid air-conditioning system", Bergero, Chiari, Energy and Buildings, (2010), 11 pgs.
Chant, Eileen E., et al., "A Steady-State Simulation Of An Advanced Desiccant-Enhanced Cooling And Dehumidification System", ASHRAE Transactions: Research, (Jul. 1992), 339-347.
Coad, William J., "Conditioning Ventilation Air for Improved Performance and Air Quality", HPAC Heating/Piping/Air Conditioning, (Sep. 1999), 6 pgs.
Diblasio, Robert, "Desicants in Hospitals—Conditioning A Research Facility", DiBLASIO Engineered Systems, (Sep. 1995), 4 pgs.
Downing, et al., "Operation and Maintenance for Quality Indoor Air", Proceedings of the 7th Symposium On Improving Building Systems in Hot and Humid Climates, Ft. Worth, TX, (Oct. 9, 1990), 5 pgs.
Downing, Chris, "Humidity Control—No Place Like Home", Engineered Systems, (1996), 4 pgs.
Erb, Blake, et al., "Experimental Measurements of a Run-Around Membrane Energy Exchanger (RAMEE) with Comparison to a Numerical Model", ASHRAE Transactions, (2009).
Fischer, J., et al., "Active Desiccant Dehumidification Module Integration With Rooftop Packaged HVAC Units—Final Report Phase 3B", Oak Ridge National Laboratory, (Mar. 2002), 36 pgs.
Fischer, John C., "Optimizing IAQ, Humidity Control, and Energy Efficiency In School Environments Through The Application Of Desiccant-Based Total Energy Recovery Systems", IAQ '96. Atlanta: Paths to Better Building Environments/Environmental Effects on Heath and Productivity, (1996), 179-194.
Harriman, III, et al., "Dehumidification and Cooling Loads From Ventilation Air", ASHRAE Journal, (Nov. 1997), 7 pgs.
Harriman, III, et al., "Evaluating Active Desiccant Systems For Ventilating Commercial Buildings", ASHRAE Journal, (Oct. 1999), 7 pgs.
Harriman, III, et al., "New Weather Data For Energy Calculations", ASHRAE Journal, (Mar. 1999), 7 pgs.
Jeong, et al., "Energy Conservation Benefits of a Dedicated Outdoor Air System with Parallel Sensible Cooling By Ceiling Radiant Panels", ASHRAE Transactions; vol. 109• Part 2, (2003), 10 pgs.

(56) References Cited

OTHER PUBLICATIONS

Karniadakis, George E., et al., "Mimimum-dissipation transport enhancement by flow destabilization: Reynolds' analogy revisited", J. Fluid Mech vol. 192, (1988), 365-391.

Kosar, Douglas R., et al., "Dehumidification Issues of Standard 62-1989", ASHARE Journal, (Mar. 1998), 71-75.

Larson, Michael David, et al., "The Performance of Membranes in a Newly Proposed Run-Around Heat and Mositure Exchanger", Thesis Submitted to the College of Graduate Studies and Research In Partial Fulfillment of the Requirements For the Degree of Master of Science In the Department of Mechanical Engineering UniversitY of Saskatchewan Saskatoon Canada, http/ /lib ran. usask.ca/theses/available/etd-12192006-094159/urnestricted/Larson Thesis.pdf, (Dec. 2006), 177 pgs.

Mahmud, Khizir, "Design and Performance Testing of Counter-Cross-Flow Run-Around Membrane Energy Exchanger System", Master Thesis Submitted to the College of Graduate Studies and Research In Partial Fulfillment of the Requirements For the Degree of Master of Science In the Department of Mechanical Engineering University of Saskatchewan Saskatoon Canada, http I /libran•. usask. ca/theses/ available/ etd-09092009-223 83 3/urnestricted/ Khizir_Mahmud 2009-Sep-28a. pdf, (Sep. 2009), 176 pgs.

Mahmud, Khizir, et al., "Performance testing of a counter-cross-flow run-around membrane energy exchanger (RAMEE) system for HVAC applications", Energy and Buildings, 42, (2010), 1140-1146.

McGahey, Kevin, et al., "Desiccants: Benefits for the Second Century of Air Conditioning", Proceedings of the Tenth Symposium On Improving Building Systems In Hot and Humid Climates, Ft. Worth, Texas, (May 14, 1996), 9 pgs.

McGahey, Kevin, "New Commercial Applications For Desiccant-Based Cooling", ASHARE Journal, (Jul. 1998), 41-45.

Mumma, Stanley A., et al., "Achieving Dry Outside Air in an Energy-Efficient Manner", ASH RAE Transactions 2001; vol. 107; Part 1, (2001), 8 pgs.

Mumma, Stanley A., "Dedicated Outdoor Air-Dual Wheel System Control Requirements", ASHRAE Transactions 2001; vol. 107; Part 1, (2001), 9 pgs.

Mumma, Stanley A., et al., "Extension of the Multiple Spaces Concept of ASH RAE Standard 62 to Include Infiltration, Exhaust/ Exfiltration, Interzonal Transfer, and Additional Short-Circuit Paths", ASHRAE Transactions: Symposia, (1998), 1232-1241.

Mumma, Stanley A, "Overview of Integrating Dedicated Outdoor Air Systems With Parallel Terminal Systems", ASH RAE Transactions vol. 107; Part 1, (2001), 7 pgs.

Nimmo, B. G., et al., "DEAC: Desiccant Enhancement of Cooling-Based Dehumidification", ASHRAE Transactions: Symposia, (1993), 842-848.

Qin, C. K., et al., "Engine-driven Desiccant-assisted Hybrid Air-conditioning System", 23rd World Gas Conference, Amsterdam, (2006), 15 pgs.

Ryan, K., et al., "Three-dimensional transition in the wake of bluff elongated cylinders", J. Fluid, Mech vol. 538, (2005), 1-29.

Scofield, et al., "HVAC Design for Classrooms: Divide and Conquer", Heating/Piping/Air Conditioning, (May 1993), 53-59.

Sevigny, et al., "Air Handling Unit Direct Digital Control System Retrofit To Provide Acceptable Indoor Air Quality And Global Energy Optimization", Energy Engineering; vol. 94; No. 5, (1997), 24-43.

Shank, et al., "Selecting the Supply Air Conditions for a Dedicated Outdoor Air System Working in Parallel with Distributed Sensible Cooling Terminal Equipment", ASHRAE Transactions vol. 107; Part 1, (2001), 10 pgs.

Smith, Christopher S., et al., "Outdoor Air, Heat Wheels and JC Penny: A New Approach to Retail Ventilation", Proceedings of the Eleventh Symposium On Improving Building Systems In Hot and Humid Climates, Ft. Worth, Texas, (Jun. 2, 1998), 1 pg.

Smith, James C., "Schools Resolve IAQ/Humidity Problems with Desiccant Preconditioning", Heating/Piping/Air Conditioning, (Apr. 1996), 6 pgs.

Swails, James F., et al., "A Cure for Growing Pains", Consulting Specifying Engineer, [Online] retrieved from the internet:www.csermag.com, (Jun. 1997), 4 pgs.

Turpin, Joanna, "Dehumidification: The Problem No One Wants To Talk About (Apr. 2000)", [online] [retrieved on May 6, 2011]. Retrieved from the Internet:http//www.esmagazine.com/copyrighVde12c1c879ba801 0VgnVCM1 00000f932a8c0_?>, (posted on Apr. 5, 2000), 6 pgs.

Vali, et al., "Numerical model and effectiveness correlations for a run-around heat recovery system with combined counter and cross flow exchangers", International Journal of Heat and Mass Transfer 52, (2009), 5827-5840 pgs.

Vali, Alireza, "Modeling a Run-Around Heat and Moisture Exchanger Using Two Counter/Cross Flow Exchangers", Master Thesis Submitted to the College of Graduate Studies and Research In Partial Fulfillment of the Requirements For the Degree of Master of Science In the Department of Mechanical Engineering University of Saskatchewan Saskatoon Canada, http:/ /library. usask.ca/theses/m ailable/etd-060 3 2009-15-J.6-J.-1./unrestricted/ Vali.Alireza Thesis. pdf, (2009), 193 pgs.

Woods, J, et al., "Desiccant Enhanced Evaporative Air Conditioning: Parametric Analysis and Design", Presented at the Second International Conference on Building Energy and Environment (COBEE2012), Conference Paper, (Oct. 2012), 10 pgs.

Yborra, Stephen C., "Field Evaluation of Desiccant-Integrated HVAC Systems: A Review of Case Studies in Multiple Commercial/ Institutional Building Types", Proceedings of the Eleventh Symposium On Improving Building Systems In Hot and Humid Climates, Ft. Worth, Texas, (Jun. 2, 1998), 361-370.

"U.S. Appl. No. 13/449,598, Notice of Allowance dated Jul. 6, 2017", 7 pgs.

"U.S. Appl. No. 13/797,062, Amendment and Response Under 37 C.F.R. 1.116 Filed Jan. 22, 2018 to Final Office Action dated Feb. 24, 2016", 11 pgs.

"U.S. Appl. No. 13/797,062, Appeal Decision dated Nov. 22, 2017", 15 pgs.

"U.S. Appl. No. 13/797,152, Notice of Allowance dated Jun. 27, 2017", 8 pgs.

"U.S. Appl. No. 14/171,951, Notice of Allowance dated Jan. 19, 2018", 5 pgs.

"U.S. Appl. No. 14/171,951, Notice of Allowance dated Jun. 8, 2017", 5 pgs.

"U.S. Appl. No. 14/171,951, Notice of Allowance dated Oct. 3, 2017", 5 pgs.

"U.S. Appl. No. 14/187,413, Final Office Action dated Jun. 27, 2017", 16 pgs.

"U.S. Appl. No. 14/187,413, Non Final Office Action dated Dec. 18, 2017", 20 pgs.

"U.S. Appl. No. 14/187,413, Response filed Jun. 8, 2017 to Non Final Office Action dated Feb. 8, 2017", 15 pgs.

"U.S. Appl. No. 14/187,413, Response filed Nov. 27, 2017 to Final Office Action dated Jun. 27, 2017", 14 pgs.

"U.S. Appl. No. 14/190,715, Non Final Office Action dated Aug. 10, 2017", 9 pgs.

"U.S. Appl. No. 14/190,715, Response filed Jul. 12, 2017 to Restriction Requirement dated Apr. 12, 2017", 7 pgs.

"U.S. Appl. No. 14/190,715, Response filed Nov. 9, 2017 to Non Final Office Action dated Aug. 10, 2017", 10 pgs.

"U.S. Appl. No. 14/192,019, Final Office Action dated Nov. 28, 2017", 16 pgs.

"U.S. Appl. No. 14/192,019, Non Final Office Action dated May 19, 2017", 15 pgs.

"U.S. Appl. No. 14/192,019, Response filed Aug. 21, 2017 to Non Final Office Action dated May 19, 2017", 13 pgs.

"U.S. Appl. No. 14/804,953, Corrected Notice of Allowance dated Jan. 25, 2018", 4 pgs.

"U.S. Appl. No. 14/804,953, Notice of Allowance dated May 9, 2017", 7 pgs.

"U.S. Appl. No. 14/804,953, Notice of Allowance dated Sep. 7, 2017", 7 pgs.

"U.S. Appl. No. 14/957,795, Final Office Action dated Nov. 6, 2017", 17 pgs.

(56) References Cited

OTHER PUBLICATIONS

"U.S. Appl. No. 14/957,795, Response filed Aug. 3, 2017 to Non Final Office Action dated Apr. 3, 2017", 17 pgs.
"U.S. Appl. No. 15/590,685, Non Final Office Action dated Oct. 6, 2017", 11 pgs.
"Australian Application Serial No. 2013305427, Response filed Oct. 10, 2017 to Examination Report dated Mar. 3, 2017", 30 pgs.
"Australian Application Serial No. 2013305428, Office Action dated May 30, 2017", 5 pgs.
"Australian Application Serial No. 2014231668, First Examination Report dated Dec. 6, 2017", 6 pgs.
"Australian Application Serial No. 2014231672, First Examiners Report dated Jul. 14, 2017", 4 pgs.
"Australian Application Serial No. 2014231672, Response filed Oct. 9, 2017 to First Examiners Report dated Jul. 14, 2017", 24 pgs.
"Australian Application Serial No. 2014231680, First Examiners Report dated Aug. 4, 2017", 4 pgs.
"Australian Application Serial No. 2014231681, First Examiners Report dated Jul. 12, 2017", 4 pgs.
"Australian Application Serial No. 2014231681, Response filed Sep. 15, 2017 to First Examiners Report dated Jul. 12, 2017", 9 pgs.
"Australian Application Serial No. 2014231681, Subsequent Examiners Report dated Sep. 26, 2017", 4 pgs.
"Australian Application Serial No. 2015230799, First Examiner Report dated Mar. 27, 2017", 10 pgs.
"Canadian Application Serial No. 2,801,352, Office Action dated Jul. 4, 2017", 3 pgs.
"Canadian Application Serial No. 2,801,352, Response filed Dec. 18, 2017 to Office Action dated Jul. 4, 2017", 8 pgs.
"Canadian Application Serial No. 2,901,483, Office Action dated Jul. 19, 2017", 3 pgs.
"Canadian Application Serial No. 2,901,483, Response filed Jan. 16, 2018 to Office Action dated Jul. 19, 2017", 28 pgs.
"Canadian Application Serial No. 2,901,483, Response filed May 23, 2017 to Office Action dated Nov. 23, 2016", 40 pgs.
"Chinese Application Serial No. 201380042926.0, Office Action dated May 11, 2017", W/ English Translation, 13 pgs.
"Chinese Application Serial No. 201380042926.0, Response filed Sep. 26, 2017 to Office Action dated May 11, 2017", claims not amended in response, current pending claims included in attachment, 13 pgs.
"Chinese Application Serial No. 201380044484.3, Office Action dated Jul. 31, 2017", With English Translation, 21 pgs.
"Chinese Application Serial No. 201380044484.3, Response filed Mar. 28, 2017 to Office Action dated Jan. 13, 2017", (wl English Translation of Claims), 58 pgs.
"Chinese Application Serial No. 201380044484.3, Response filed Oct. 12, 2017 to Office Action dated Jul. 31, 2017", w/ claims in English, 54 pgs.
"Chinese Application Serial No. 201480014783.7, Office Action dated Jun. 30, 2017", (English Translation), 19 pgs.
"Chinese Application Serial No. 201480014783.7, Response filed Nov. 10, 2017 to Office Action dated Jun. 30, 2017", w/ claims in English, 48 pgs.
"Chinese Application Serial No. 201480015355.6, Office Action dated Oct. 13, 2017", w/ English translation, 13 pgs.
"Chinese Application Serial No. 201480015355.6, Response filed Jun. 13, 2017 to Office Action dated Nov. 28, 2016", (w/ English Translation of Claims), 36 pgs.
"Chinese Application Serial No. 201480015422.4, Response filed May 12, 2017 to Office Action dated Nov. 1, 2016", w/ claims in English, 47 pgs.
"Chinese Application Serial No. 201480016150.X, Office Action dated Jun. 19, 2017", (w/ English Translation), 22 pgs.
"Chinese Application Serial No. 201480016150.X, Response filed Nov. 2, 2017 to Office Action dated Jun. 19, 2017", w/ claims in English, 82 pgs.
"European Application Serial No. 14764305.0, Response filed Oct. 31, 2017 to Extended European Search Report dated Apr. 4, 2017", 7 pgs.
"European Application Serial No. 14764318.3, Response filed Oct. 10, 2017 to Extended European Search Report dated Mar. 15, 2017", 11 pgs.
"European Application Serial No. 14764713.5, Response filed Jul. 13, 2017 to Extended European Search Report dated Dec. 9, 2016", 9 pgs.
"European Application Serial No. 14765396.8, Response filed May 25, 2017 to Extended European Search Report dated Oct. 28, 2016", 5 pgs.
"European Application Serial No. 15834201.4, Response filed Oct. 9, 2017 to Communication Pursuant to Rules 161(2) and 162 EPC dated Mar. 29, 2017", 15 pgs.
"International Application Serial No. PCT/CA2016/050252, International Preliminary Report on Patentability dated Nov. 30, 2017", 6 pgs.
"International Application Serial No. PCT/CA2016/050507, International Preliminary Report on Patentability dated Nov. 30, 2017", 5 pgs.
"International Application Serial No. PCT/CA2017/050180, International Search Report dated Apr. 26, 2017", 3 pgs.
"International Application Serial No. PCT/CA2017/050180, Written Opinion dated Apr. 26, 2017", 4 pgs.
"International Application Serial No. PCT/IB2016/053799, International Preliminary Report on Patentability dated Jan. 4, 2018", 8 pgs.
Mahmud, Khizir, et al., "Performance testing of a counter-cross-flow run-around membrane energy exchanger (RAMEE) system for HVAC applications", Energy and Buildings 42, (2010), 1139-1147.
"U.S. Appl. No. 14/190,715, Response filed Jul. 20, 2018 to Final Office Action dated Feb. 20, 2018", 14 pgs.
"U.S. Appl. No. 13/797,062, Final Office Action dated Jul. 13, 2018", 22 pgs.
"U.S. Appl. No. 13/797,062, Non Final Office Action dated Feb. 21, 2018", 21 pgs.
"U.S. Appl. No. 13/797,062, Response filed May 21, 2018 to Non Final Office Action dated Feb. 21, 2018", 12 pgs.
"U.S. Appl. No. 14/171,951, Notice of Allowability dated Jul. 18, 2018", 2 pgs.
"U.S. Appl. No. 14/171,951, Notice of Allowance dated May 23, 2018", 5 pgs.
"U.S. Appl. No. 14/187,413, Final Office Action dated Jul. 26, 2018", 16 pgs.
"U.S. Appl. No. 14/190,715, Final Office Action dated Feb. 20, 2018", 9 pgs.
"U.S. Appl. No. 14/192,019, Non Final Office Action dated May 11, 2018", 16 pgs.
"U.S. Appl. No. 14/192,019, Response filed Apr. 27, 2018 to Final Office Action dated Nov. 28, 2017", 11 pgs.
"U.S. Appl. No. 14/957,795, Corrected Notice of Allowance dated May 16, 2018", 4 pgs.
"U.S. Appl. No. 14/957,795, Notice of Allowance dated Apr. 27, 2018", 8 pgs.
"U.S. Appl. No. 14/957,795, Response filed Apr. 3, 2018 to Final Office Action dated Nov. 6, 2017", 11 pgs.
"U.S. Appl. No. 15/185,155, Non Final Office Action dated Apr. 10, 2018", 13 pgs.
"U.S. Appl. No. 15/185,155, Response filed Aug. 6, 2018 to Non Final Office Action dated Apr. 10, 2018", 10 pgs.
"U.S. Appl. No. 15/185,180, Restriction Requirement dated Jun. 21, 2018", 10 pgs.
"U.S. Appl. No. 15/590,685, Final Office Action dated Jun. 7, 2018", 12 pgs.
"U.S. Appl. No. 15/590,685, Response filed Feb. 20, 2018 to Non Final Office Action dated Oct. 6, 2017", 7 pgs.
"Australian Application Serial No. 2013305428, Response filed May 15, 2018 to Office Action dated May 30, 2017", 23 pgs.
"Australian Application Serial No. 2014231667, First Examination Report dated Apr. 5, 2018", 4 pgs.
"Australian Application Serial No. 2014231667, Response filed Jul. 20, 2018 to First Examination Report dated Apr. 5, 2018", 19 pgs.
"Australian Application Serial No. 2014231668, Response filed Mar. 14, 2018 to First Examination Report dated Dec. 6, 2017", 31 pgs.

(56) References Cited

OTHER PUBLICATIONS

"Australian Application Serial No. 2014231668, Subsequent Examiners Report dated Apr. 5, 2018", 3 pgs.
"Australian Application Serial No. 2014231681, Response filed Jan. 30, 2018 to Subsequent Examiners Report dated Sep. 26, 2017", 15 pgs.
"Australian Application Serial No. 2014231681, Response filed Apr. 26, 2018 to Subsequent Examiners Report dated Mar. 13, 2018", 3 pgs.
"Australian Application Serial No. 2014231681, Subsequent Examiners Report dated Mar. 13, 2018", 4 pgs.
"Australian Application Serial No. 2015230799, Response filed Feb. 16, 2018 to First Examiner Report dated Mar. 27, 2017", 24 pgs.
"Canadian Application Serial No. 2,801,352, Office Action dated Aug. 2, 2018", 3 pgs.
"Chinese Application Serial No. 201380042926.0, Decision of Rejection dated Jan. 5, 2018", w/ English Claims, 11 pgs.
"Chinese Application Serial No. 201380042926.0, Request for Reexamination filed Apr. 20, 2018 to Decision of Rejection dated Jan. 5, 2018", w/ English claims, 52 pgs.
"Chinese Application Serial No. 201380044484.3, Examiner Interview Summary Jan. 3, 2018", w/ English Translation, 1 pg.
"Chinese Application Serial No. 201380044484.3, Response filed Jan. 3, 2018 to Examiner Interview Summary Jan. 3, 2018", w/ English claims, 53 pgs.
"Chinese Application Serial No. 201480014783.7, Office Action dated Mar. 26, 2018", w/ English Translation, 16 pgs.
"Chinese Application Serial No. 201480014783.7, Response filed Jun. 11, 2018 to Office Action dated Mar. 26, 2018", w/ English claims, 18 pgs.
"Chinese Application Serial No. 201480015355.6, Office Action dated Jun. 14, 2018", w/ English summary, 8 pgs.
"Chinese Application Serial No. 201480015355.6, Response filed Feb. 28, 2018 to Office Action dated Oct. 13, 2017", w/ English claims, 36 pgs.
"European Application Serial No. 15834201.4, Extended European Search Report dated Mar. 16, 2018", 8 pgs.
"European Application Serial No. 16795581.4, Response filed Aug. 6, 2018 to Communication Pursuant to Rules 161(2) and 162 EPC dated Jan. 26, 2018", 16 pgs.
"European Application Serial No. 16795582.2, Response filed Jul. 17, 2018 to Communication Pursuant to Rules 161(2) and 162 EPC dated Jan. 8, 2018", 12 pgs.
"European Application Serial No. 18153408.2, Communication Pursuant to Rule 55 EPC dated May 17, 2018", 2 pgs.
U.S. Appl. No. 15/574,201, filed Nov. 15, 2017, Using Liquid to Air Membrane Energy Exchanger for Liquid Cooling.
U.S. Appl. No. 15/739,016, filed Dec. 21, 2017, Three-Fluid Liquid to Air Membrane Energy Exchanger.
U.S. Appl. No. 15/590,685, filed May 9, 2017, Liquid Panel Assembly.
U.S. Appl. No. 60/163,731, filed Nov. 5, 1999, Humidity Pump.
U.S. Appl. No. 15/574,205, filed Nov. 15, 2017, Systems and Methods for Managing Conditions in Enclosed Space.
U.S. Appl. No. 15/814,153, filed Nov. 15, 2017, Systems and Methods for Providing Cooling to a Heat Load.
U.S. Appl. No. 16/083,280, filed Sep. 7, 2018, Systems and Methods for Providing Cooling to a Heat Load.
U.S. Appl. No. 13/449,598, filed Apr. 18, 2012, Energy Exchange System for Conditioning Air in an Enclosed Structure.
U.S. Appl. No. 15/185,180, filed Jun. 17, 2016, Energy Exchange System for Conditioning Air in an Enclosed Structure.
U.S. Appl. No. 13/702,596, filed Apr. 15, 2013, U.S. Pat. No. 9,234,665, Liquid-to-Air Membrane Energy Exchanger.
U.S. Appl. No. 14/957,795, filed Dec. 3, 2015, Liquid-to-Air Membrane Energy Exchanger.
U.S. Appl. No. 13/737,473, filed Jan. 9, 2013, System and Method for Providing Conditioned Air to an Enclosed Structure.
U.S. Appl. No. 13/797,152, filed Mar. 12, 2013, Liquid Panel Assembly.
U.S. Appl. No. 13/797,062, filed Mar. 12, 2013, Membrane Support Assembly for an Energy Exchanger.
U.S. Appl. No. 14/187,413, filed Feb. 24, 2014, Evaporative Cooling System with Liquid-to-Air Membrane Energy Exchanger.
U.S. Appl. No. 13/801,280, filed Mar. 13, 2013, U.S. Pat. No. 9,109,808, Variable Desiccant Control Energy Exchange System and Method.
U.S. Appl. No. 14/804,953, filed Jul. 21, 2015, Variable Desiccant Control Energy Exchange System and Method.
U.S. Appl. No. 15/185,155, filed Jun. 17, 2016, Variable Desiccant Control Energy Exchange System and Method.
U.S. Appl. No. 14/192,019, filed Feb. 27, 2014, Energy Exchange Assembly with Microporous Membrane.
U.S. Appl. No. 14/190,715, filed Feb. 26, 2014, Membrane-Integrated Energy Exchange Assembly.
U.S. Appl. No. 14/171,951, filed Feb. 4, 2014, Control System and Method for a Liquid Desiccant Air Delivery System.
U.S. Appl. No. 10/048,797, filed Jan. 31, 2002, U.S. Pat. No. 6,684,649, Enthalpy Pump.
"U.S. Appl. No. 13/797,062, Response filed Dec. 13, 2018 to Final Office Action dated Jul. 13, 2018", 12 pgs.
"U.S. Appl. No. 14/187,413, Advisory Action dated Dec. 17, 2018", 5 pgs.
"U.S. Appl. No. 14/187,413, Amendment and Response filed Nov. 30, 2018 to Final Office Action dated Jul. 26, 2018", 19 pgs.
"U.S. Appl. No. 14/190,715, Examiner Interview Summary dated Oct. 31, 2018", 3 pgs.
"U.S. Appl. No. 14/192,019, Response filed Sep. 11, 2018 to Non Final Office Action dated May 11, 2018", 12 pgs.
"U.S. Appl. No. 14/957,795, Notice of Allowance dated Sep. 11, 2018", 9 pgs.
"U.S. Appl. No. 15/185,155, Final Office Action dated Dec. 5, 2018", 11 pgs.
"U.S. Appl. No. 15/185,180, Response filed Nov. 19, 2018 to Restriction Requirement dated Jun. 21, 2018", 9 pgs.
"U.S. Appl. No. 15/574,201, Restriction Requirement dated Sep. 5, 2018", 6 pgs.
"U.S. Appl. No. 15/574,205, Non Final Office Action dated Sep. 11, 2018", 6 pgs.
"U.S. Appl. No. 15/590,685, Advisory Action dated Dec. 12, 2018", 3 pgs.
"U.S. Appl. No. 15/590,685, Response filed Nov. 30, 2018 to Final Office Action dated Jun. 7, 2018", 10 pgs.
"U.S. Appl. No. 15/739,016, Restriction Requirement dated Nov. 26, 2018", 5 pgs.
"Australian Application Serial No. 2014231667, Subsequent Examiners Report dated Aug. 29, 2018", 4 pgs.
"Australian Application Serial No. 2017204552, First Examination Report dated Oct. 9, 2018", 3 pgs.
"Chinese Application Serial No. 201380042926.0, Notice of Reexamination dated Aug. 23, 2018", w/ English Machine Translation, 18 pgs.
"Chinese Application Serial No. 201380042926.0, Response filed Dec. 7, 2018 to Notice of Reexamination dated Aug. 23, 2018", w/ English Translation, 15 pgs.
"Chinese Application Serial No. 201480015355.6, Response filed Dec. 4, 2018 to Office Action dated Jun. 14, 2018", w/ English claims, 16 pgs.
"European Application Serial No. 11797695.1, Communication Pursuant to Article 94(3) EPC dated Aug. 24, 2018", 5 pgs.
"European Application Serial No. 14764713.5, Communication pursuant to Article 94(3) EPC dated Dec. 18, 2018", 3 pgs.
"European Application Serial No. 14765396.8, Communication Pursuant to Article 94(3) EPC dated Dec. 5, 2018", 4 pgs.
"European Application Serial No. 15834201.4, Response filed Oct. 15, 2018 to Extended European Search Report dated Mar. 16, 2018", 17 pgs.
"European Application Serial No. 16795582.2, Extended European Search Report dated Nov. 20, 2018", 8 pgs.
"European Application Serial No. 18153408.2, Extended European Search Report dated Dec. 4, 2018", 5 pgs.

(56) References Cited

OTHER PUBLICATIONS

"International Application Serial No. PCT/CA2017/050180, International Preliminary Report on Patentability dated Sep. 20, 2018", 6 pgs.
"U.S. Appl. No. 14/171,951, Notice of Allowance dated Nov. 6, 2019", 6 pgs.
"U.S. Appl. No. 15/590,685, Response filed Dec. 19, 2019 to Final Office Action dated Jun. 26, 2019"; 11 pgs.
"U.S. Appl. No. 15/739,016, Notice of Allowance dated Nov. 20, 2019", 7 pgs
"Australian Application Serial No. 2015306040, First Examination Report dated Nov. 8, 2019", 4 pgs.
"Canadian Application Serial No. 2,880,353, Response filed Oct. 29, 2019 to Office Action dated Apr. 29, 2019", 28 pgs.
"Canadian Application Serial No. 2,901,484, Office Action dated Dec. 11, 2019", 6 pgs.
"Canadian Application Serial No. 3,046,529, Office Action dated Sep. 18, 2019", 6 pgs
"Chinese Application Serial No. 201580053421.3, Office Action dated Sep. 17, 2019", w/ English Translation, 31 pgs.
"Chinese Application Serial No. 201680048895.3, Response filed Nov. 4, 2019 to Office Action dated Apr. 17, 2019", w/ English claims, 29 pgs.
"Chinese Application Serial No. 201710708143.1; Response filed Sep. 27, 2019 to Office Action dated Aug. 16, 2019", wl English claims, 10 pgs.
"European Application Serial No. 16795581.4, Response filed Sep. 11, 2019 to Extended European Search Report dated Feb. 12, 2019", 14 pgs.
"European Application Serial No. 16813836.0, Response to Extended European Search Report dated Mar. 25, 2019", 11 pgs.
"European Application Serial No. 17762365.9, Extended European Search Report dated Oct. 17, 2019", 8 pgs.
Abdel-Salam, Mohamed R.H., et al., "Design and testing of a novel 3-fluid liquid-to-air membrane energy exchanger (3-fluid LAMEE)", International Journal of Heat and Mass Transfer 92, (2016), 312-329.
Abdel-Salam, Mohamed R.H., et al., "Performance Testing of a Novel 3-Fluid Liquid-to-Air Membrane Energy Exchanger (3-Fluid LAMEE) for HVAC Applications", 28th Intl. Conference on Efficiency, Cost, Optimization, Simulation and Environmental Impact of Energy Systems (ECOS), Pau, France, (Jun. 30, 2015), 12 pgs.
"U.S. Appl. No. 13/797,062, Final Office Action dated Jul. 25, 2019", 50 pgs.
"U.S. Appl. No. 13/797,062, Non Final Office Action dated Dec. 28, 2018", 50 pgs.
"U.S. Appl. No. 13/797,062, Response filed Jun. 28, 2019 to Non Final Office Action dated Jun. 28, 1019", 12 pgs.
"U.S. Appl. No. 14/171,951, Notice of Allowance dated Jan. 9, 2019", 6 pgs.
"U.S. Appl. No. 14/187,413, Non Final Office Action dated Jul. 31, 2019", 22 pgs.
"U.S. Appl. No. 14/190,715, Notice of Allowance dated Mar. 4, 2019", 7 pgs.
"U.S. Appl. No. 14/192,019, Final Office Action dated Jan. 10, 2019", 16 pgs.
"U.S. Appl. No. 14/192,019, Non Final Office Action dated Jun. 25, 2019", 13 pgs.
"U.S. Appl. No. 14/192,019, Response filed Jun. 10, 2019 to Final Office Action dated Jan. 20, 2019", 10 pgs.
"U.S. Appl. No. 14/957,795, Corrected Notice of Allowability dated Feb. 1, 2019", 4 pgs.
"U.S. Appl. No. 14/957,795, Notice of Allowance dated Jan. 17, 2019", 7 pgs.
"U.S. Appl. No. 15/185,155, Corrected Notice of Allowability dated May 15, 2019", 2 pgs.
"U.S. Appl. No. 15/185,155, Corrected Notice of Allowability dated May 22, 2019", 2 pgs.
"U.S. Appl. No. 15/185,155, Examiner Interview Summary dated Feb. 21, 2019", 3 pgs.
"U.S. Appl. No. 15/185,155, Notice of Allowance dated Mar. 25, 2019", 7 pgs.
"U.S. Appl. No. 15/185,155, Notice of Allowance dated Jul. 17, 2019", 8 pgs.
"U.S. Appl. No. 15/185,155, Response filed Mar. 5, 2019 to Final Office Action dated Dec. 5, 2018", 9 pgs.
"U.S. Appl. No. 15/185,180, Final Office Action dated Jul. 31, 2019", 15 pgs.
"U.S. Appl. No. 15/185,180, Non Final Office Action dated Jan. 8, 2019", 14 pgs.
"U.S. Appl. No. 15/185,180, Response filed May 1, 2019 to Non Final Office Action dated Jan. 8, 2019", 11 pgs.
"U.S. Appl. No. 15/590,685, Final Office Action dated Jun. 26, 2019", 14 pgs.
"U.S. Appl. No. 15/590,685, Non Final Office Action dated Jan. 11, 2019", 13 pgs.
"U.S. Appl. No. 15/590,685, Response filed Apr. 18, 2019 to Non Final Office Action dated Jan. 11, 2019", 11 pgs.
"U.S. Appl. No. 15/739,016, Non Final Office Action dated Feb. 13, 2019", 6 pgs.
"U.S. Appl. No. 15/739,016, Notice of Allowance dated Aug. 1, 2019", 6 pgs.
"U.S. Appl. No. 15/739,016, Response filed Jan. 28, 2019 to Restriction Requirement dated Nov. 26, 2018", 8 pgs.
"U.S. Appl. No. 16/431,397, Supplemental Preliminary Amendment filed Aug. 2, 2019", 6 pgs.
"Australian Application Serial No. 2014231667, Response filed Jan. 15, 2019 to Subsequent Examiners Report dated Aug. 29, 2018", 12 pgs.
"Australian Application Serial No. 2018202342, First Examination Report dated Jun. 17, 2019", 5 pgs.
"Australian Application Serial No. 2018202342, Response filed Aug. 1, 2019 to First Examination Report dated Jun. 17, 2019", 17 pgs.
"Australian Application Serial No. 2018202342, Subsequent Examiners Report dated Aug. 23, 2019", 4 pgs.
"Australian Application Serial No. 2018204774, First Examination Report dated Jul. 18, 2019", 4 pgs.
"Australian Application Serial No. 2018226496, First Examination Report dated Jul. 25, 2019", 4 pgs.
"Australian Application Serial No. 2019201063, First Examination Report dated Aug. 6, 2019", 7 pgs.
"Canadian Application Serial No. 2,801,352, Response filed Jan. 29, 2019 to Office Action dated Aug. 2, 2018", 12 pgs.
"Canadian Application Serial No. 2,880,350, Examiner's Rule 30(2) Requisition dated May 1, 2019", 4 pgs.
"Canadian Application Serial No. 2,880,353, Office Action dated Apr. 29, 2019", 4 pgs.
"Chinese Application Serial No. 201380042926.0, Decision of Reexamination—Upholding Decision of Rejection dated Mar. 15, 2019", w/ English Translation, 18 pgs.
"Chinese Application Serial No. 201480015355.6, Decision of Rejection dated Mar. 18, 2019", w/ English Translation, 7 pgs.
"Chinese Application Serial No. 201680038134.X, Office Action dated Jul. 8, 2019", w/ English Translation, 30 pgs.
"Chinese Application Serial No. 201680038135.4, Office Action dated Aug. 26, 2019", w/o English Translation, 12 pgs.
"Chinese Application Serial No. 201680048895.3, Office Action dated Apr. 17, 2019", W/ English Translation, 33 pgs.
"Chinese Application Serial No. 201710339973.1, Office Action dated Apr. 26, 2019", w/ English Translation, 9 pgs.
"Chinese Application Serial No. 201710339973.1, Response filed Jul. 3, 2019 to Office Action dated Apr. 26, 2019", w/ English Claims, 14 pgs.
"Chinese Application Serial No. 201710708143.1, Office Action dated Aug. 16, 2019", w/ English Translation, 10 pgs.
"Chinese Application Serial No. 201710708143.1, Office Action dated Dec. 29, 2018", w/ English Translation, 9 pgs.
"Chinese Application Serial No. 201710708143.1, Response filed Apr. 29, 2019 to Office Action dated Dec. 29, 2018", w/ English Claims, 10 pgs.

(56) References Cited

OTHER PUBLICATIONS

"European Application Serial No. 11797695.1, Response filed Jan. 9, 2019 to Communication Pursuant to Article 94(3) EPC dated Aug. 24, 2018", 11 pgs.

"European Application Serial No. 14764305.0, Communication Pursuant to Article 94(3) EPC Feb. 14, 2019", 4 pgs.

"European Application Serial No. 14764305.0, Response filed Jun. 21, 2019 to Communication Pursuant to Article 94(3) EPC Feb. 14, 2019", 24 pgs.

"European Application Serial No. 14764713.5, Response filed Jun. 28, 2019 to Communication pursuant to Article 94(3) EPC dated Dec. 18, 2018", 8 pgs.

"European Application Serial No. 14765396.8, Response filed May 23, 2019 to Communication Pursuant to Article 94(3) EPC dated Dec. 5, 2018", 16 pgs.

"European Application Serial No. 16795581.4, Extended European Search Report dated Feb. 12, 2019", 9 pgs.

"European Application Serial No. 16795582.2, Response filed Jun. 17, 2019 to Extended European Search Report dated Nov. 20, 2018", 16 pgs.

"European Application Serial No. 16813836.0, Extended European Search Report dated Mar. 25, 2019", 9 pgs.

"European Application Serial No. 16813836.0, Partial Supplementary European Search Report dated Dec. 5, 2018", 11 pgs.

"European Application Serial No. 17762365.9, Response filed Apr. 25, 2019 to Communication Pursuant to Rules 161 and 162 dated Oct. 16, 2018", 12 pgs.

"European Application Serial No. 18153408.2, Response filed Jul. 2, 2019 to Extended European Search Report dated Dec. 4, 2018", 12 pgs.

"European Application Serial No. 18160812.6, Extended European Search Report dated Feb. 11, 2019", 6 pgs.

"European Application Serial No. 18160812.6, Response filed Aug. 6, 2019 to Extended European Search Report dated Feb. 11, 2019", 23 pgs.

"European Application Serial No. 18211142.7, Extended European Search Report dated Apr. 11, 2019", 6 pgs.

"European Application Serial No. 18211142.7, Response filed Aug. 8, 2019 to Extended European Search Report dated Apr. 11, 2019", 10 pgs.

"European Application Serial No. 18214518.5, Extended European Search Report dated Apr. 17, 2019", 5 pgs.

"European Application Serial No. 18214518.5, Response filed Jul. 16, 2019 to Extended European Search Report dated Apr. 17, 2019", 3 pgs.

"Singapore Application Serial No. 11201710777Y, Office Action dated Jan. 31, 2019", in English, 7 pgs.

"Singapore Application Serial No. 11201710777Y, Response filed Jul. 1, 2019 to Office Action dated Jan. 31, 2019", in English, 31 pgs.

"Singaporean Application Serial No. 11201709404P, Response filed Jul. 22, 2019 to Written Opinion dated Feb. 22, 2019", in English, 62 pgs.

"Singaporean Application Serial No. 11201709404P, Written Opinion dated Feb. 22, 2019", in English, 8 pgs.

Larson, Michael D., et al., "The elastic and moisture transfer properties of polyethylene and polypropylene membranes for use in liquid-to-air energy exchangers", Journal of Membrane Science 302, (2007), 14 pgs.

U.S. Appl. No. 16/351,046, filed Mar. 12, 2019, Liquid-To-Air Membrane Energy Exchanger.

U.S. Appl. No. 16/431,397, filed Jun. 4, 2019, Membrane-Integrated Energy Exchange Assembly.

"Canadian Application Serial No. 3,046,529, Response filed Nov. 14, 2019 to Office Action dated Sep. 18, 2019", 9 pgs.

"U.S. Appl. No. 15/590,685, Non Final Office Action dated Jan. 7, 2020", 15 pgs.

"Indian Application Serial No. 201817002765, First Examination Report dated Dec. 24, 2019", w/ English Translation, 6 pgs.

"Canadian Application Serial No. 2,904,224, Office Action dated Jan. 3, 2020", 4 pgs.

"Chinese Application Serial No. 201680038134.X, Response filed Jan. 23, 2020 to Office Action dated Jul. 8, 2019", w/ English claims, 32 pgs.

"Canadian Application Serial No. 2,901,492, Office Action dated Jan. 29, 2020", 4 pgs.

"Canadian Application Serial No. 2,901,495, Office Action dated Jan. 29, 2020", 4 pgs.

"U.S. Appl. No. 16/784,822, Supplemental Preliminary Amendment filed Feb. 14, 2020", 6 pgs.

"Chinese Application Serial No. 201810432187.0, Office Action dated Jan. 16, 2020", w/o English Translation, 6 pgs.

\* cited by examiner

LIQUID TO AIR MEMBRANE ENERGY EXCHANGERS

CLAIM OF PRIORITY

This application claims the benefit of U.S. Provisional Patent Application Ser. No. 62/039,254, filed on Aug. 19, 2014, the benefit of priority of which is claimed hereby, and which is incorporated by reference herein in its entirety.

BACKGROUND

A liquid to air membrane energy exchanger (LAMEE) transfers heat and moisture between a liquid desiccant and an air stream in order to condition the temperature and humidity of the air flowing through the LAMEE. LAMEEs can be employed in a number of different applications, including, for example, Heating Ventilation and Air Conditioning (HVAC) systems, dehumidification systems, evaporative cooling, industrial applications requiring treated air, etc. In another application, the exchanger transfers heat and moisture between the desiccant and air in order to condition the temperature and concentration of the desiccant by both releasing or gaining heat and releasing or gaining moisture in the desiccant in any combination.

Existing LAMEEs use micro-porous hydrophobic membranes to contain a liquid desiccant, including, for example, a halide salt. In these membranes a micro-porous structure is created in a thin film of a low surface energy polymer such as PTFE, polypropylene or polyethylene. The hydrophobic membrane resists penetration by the liquid due to surface tension, while freely allowing the transfer of gases, including water vapor, through the membrane pores. In the LAMEE application, the membranes are typically about 20 microns thick with a mean pore size of 0.1-0.2 micron. Micro-porous membranes however, are subject to two potential problems which can directly affect their function. Firstly, the membrane pores could become blocked by mineral deposition, dust accumulation, etc., which would degrade the moisture vapor transfer rate of the membrane and require cleaning to restore performance. Secondly, the membrane pores could become contaminated by a surfactant, oil, or other compound, which lowers the surface tension of the desiccant and allows penetration of the liquid through the pores. The susceptibility of micro-porous membranes to surfactants may require prevention or inhibition of environmental exposure to these compounds.

Liquid desiccants used in HVAC and drying applications are typically solutions of halide salts (such as lithium chloride, magnesium chloride, calcium chloride, or lithium bromide) and water. These solutions have two important properties: they are strongly hygroscopic and the salt is non-volatile. The hygroscopic property allows the solution to either release or absorb water vapor from an air stream depending on the water vapor pressure of the solution compared to that of the air. High concentration salt solutions (for example a 40% LiCl solution) can have very low vapor pressures, which produces a large potential for dehumidification of the air stream encountering the solution. Traditionally, liquid desiccant systems designed for industrial and commercial drying applications have used direct contact exchangers, in which a media wetted with desiccant (such as a cellulose honeycomb matrix) is exposed directly to an air stream. These exchangers require a salt that is non-volatile under the temperatures and pressures used for air treatment so that the salt does not evaporate into the air. The salt charge remains in the system and does not have to be replenished over time. Membrane exchangers with micro-porous membranes have the same requirement, since a gas phase can freely move through the membrane.

The main disadvantage of salt-based desiccants is that they are very corrosive to metals. For example, lithium chloride (LiCl) causes rapid corrosion of most ferrous and nonferrous metals with example exceptions including titanium and some copper-nickel alloys. Direct contact exchangers have not been widely used in HVAC applications because of the potential for desiccant droplet carryover into the air stream and corrosion of downstream metal ducting, fans and other air handling equipment. The membrane exchanger provides separation of the desiccant from the air, preventing droplet carryover; however, in the event of a membrane failure or liquid circuit leak, some local corrosion may occur if the desiccant is not detected and cleaned up. The corrosive desiccant also contributes to an increased cost for the exchanger and liquid pumping circuit because corrosion resistant materials may need to be used in portions of the circuit that may encounter the desiccant. Corrosion resistant sensors, pumps, heat exchangers, etc. may all contribute to increased cost for the circuit vs. components mass produced from non-corrosion resistant metals. In addition, secure containment of the desiccant is required in the event of a circuit leak or spill to prevent migration of corrosive desiccant into the air handling unit cabinet, mechanical room or building structure. This can further add to system cost and complexity. The lithium salts can also be relatively expensive, and costs may continue to rise due to pressure on the global lithium supply from lithium-ion battery production.

Glycols are another type of liquid desiccant that have been used in some drying applications. Glycols, however, are volatile and will steadily evaporate into an air stream when used in a direct contact exchanger or a membrane exchanger with micro-porous membranes. The steady consumption of glycol and the impact on air quality has made this desiccant unacceptable for most HVAC and dehumidification applications. Other potential strong hygroscopic fluids that are low cost, non-toxic and non-corrosive also may not be used in existing liquid desiccant systems because of either volatility, reactivity with air or air pollutants or production of odors. Therefore, current liquid desiccant systems are sometimes restricted to using halide salts with their inherent drawbacks.

OVERVIEW

The present inventors recognize, among other things, an opportunity for an energy exchanger that allows for use of a variety of liquid desiccants in combination with a non-porous, selectively permeable membrane.

The following non-limiting examples pertain generally, but not by way of limitation, to energy exchanger systems and methods for conditioning air in an enclosed space, such as a commercial or residential building. The following non-limiting examples are provided to further illustrate the systems and methods disclosed herein.

Examples according to the present application include LAMEEs including a membrane that is selectively permeable to water, including any of the membranes disclosed herein. Example LAMEEs in accordance with the present application can be employed in a variety of systems/applications, including, for example, residential and commercial HVAC, dehumidification, humidification, desiccant regeneration, evaporative cooling and industrial drying applications.

In one example, a LAMEE includes a selectively permeable membrane separating an air stream from a liquid desiccant. The membrane is selectively permeable to water but not to other species/constituents present in the liquid desiccant or air. In one example, the membrane is a non-porous membrane. Example membranes may allow the use of hygroscopic fluids, which may be volatile, reactive and otherwise unsuitable for use in existing micro-porous membrane or direct contact liquid desiccant exchangers. In one example, the selectively permeable membrane includes an ion exchange membrane. In another example, the selectively permeable membrane includes a pervaporation membrane.

Examples according to the present application may address at least some of the drawbacks with current LAMEE technology using halide salt solutions by including an improved combination of fluid desiccant and membrane. For example, the liquid desiccant may be selected to be strongly hygroscopic, non-corrosive, non-toxic, and low cost; the membrane may have high water transport rates, be non-permeable to other species in the chosen desiccant, low cost, and have good mechanical properties and thermal/chemical stability. LAMEE systems in accordance with the present application may have an operating performance comparable with current LAMEEs, but with potentially significantly reduced costs and risk compared to current systems using salt-based desiccants. LAMEE systems in accordance with the present application may have a broader market acceptance in the HVAC industry and lead to wider adoption of energy efficient liquid desiccant conditioning equipment. In addition, selectively permeable membranes included in examples of the present application may have a reduced risk to membrane fouling, surfactant contamination, and biological growth.

Selectively permeable membranes employed in examples of the present application may also allow the use of salt solutions that have a higher potential to precipitate out. In some cases, for example in LAMEEs including a micro-porous membrane, this could occur near the membrane surface leading to fouling, but, due to the nature of selectively permeable membranes in accordance with examples of the present application, the precipitate is not likely to foul the membrane. Instead the precipitate could flow through the LAMEE and be collected and purged from the system with a mechanical filter, leaving the membrane intact and functioning to specifications. Such membranes may also be well suited for the utilization of acetate salts, widely avoided due to the evaporation of acetic acid leading to a pungent vinegar smell in the space. The acetic acid vapors would be contained by the selectively permeable membrane.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A liquid to air membrane energy exchanger (LAMEE) can be used as part of a heating and cooling system (or energy exchange system) to transfer heat and moisture between a liquid desiccant and an air stream to condition the temperature and humidity of the air flowing through the LAMEE. The membrane can be a non-porous film having selective permeability for water, but not for other constituents that form the liquid desiccant. Many different types of liquid desiccants can be used in combination with the non-porous membrane, including, for example, glycols. The non-porous membrane can make it feasible to use desiccants, such as glycols, that had been previously determined to be unacceptable or undesirable in these types of applications. For example, ion-exchange membranes can be designed to be selectively permeable to ionic species (anions or cations) and water. Applications of ion-exchange membranes include fuel cells, desalination, water treatment, water purification, brine concentration, moisture exchange (including energy recovery exchangers), among others. These types of membranes can be constructed from polymers, inorganic materials and organic-inorganic hybrids, and can have a range of desirable attributes including very high flux rates of the permeable species, good mechanical properties and strength retention when exposed to water, and resistance to heat and chemical degradation. These membranes may also have inherent anti-fouling and anti-bacterial properties.

Example membranes are described below which are suitable with energy exchange systems described herein. Similarly, various types of liquid desiccants are described below as examples for use with the non-porous, selectively permeable membrane. It is recognized that any type of liquid desiccant that facilitates absorption of moisture from the air (or vice versa—release of moisture to the air) and is usable with a non-porous membrane can be included for use with the LAMEEs described herein.

Figure 1:
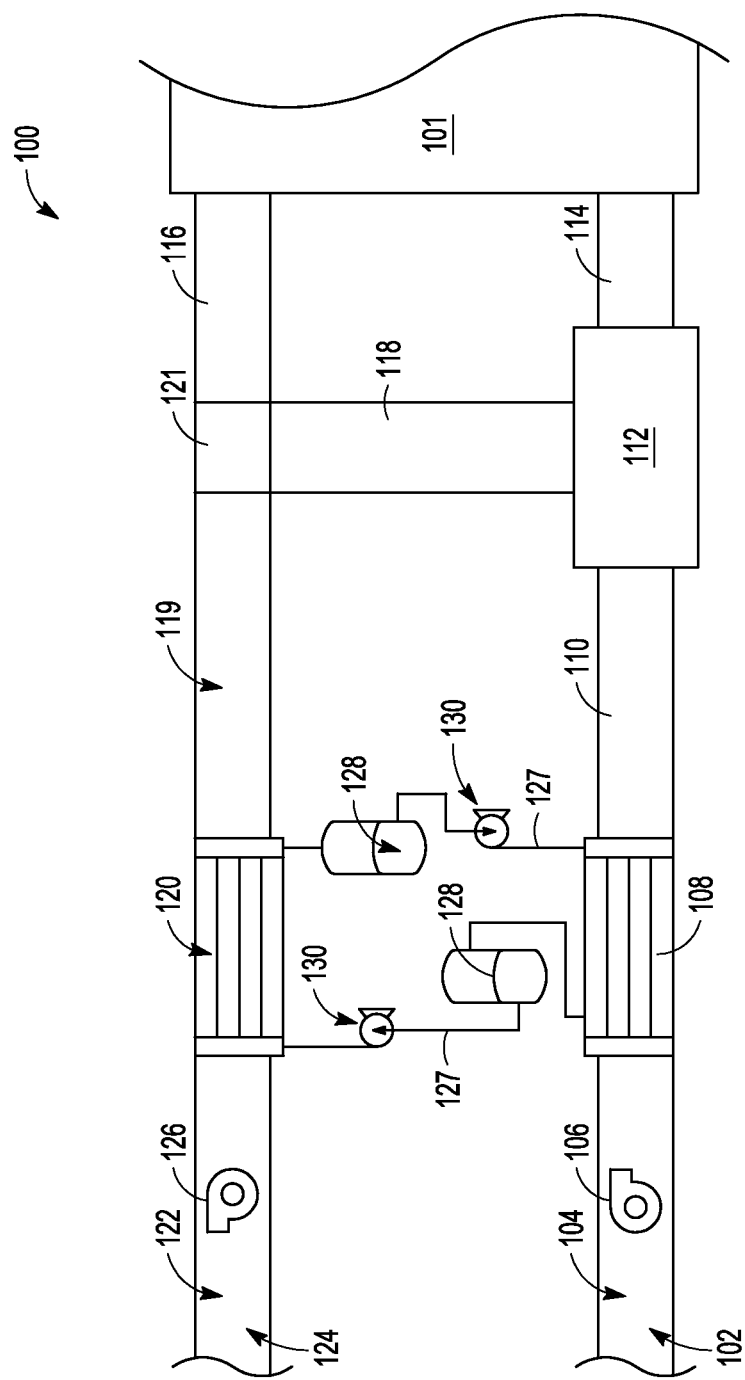
FIG. 1 is a schematic of an example energy exchange system in accordance with the present patent application.

FIG. 1 illustrates a schematic view of an example of an energy exchange system 100. The system 100 is configured to partly or fully condition air supplied to a structure 101. The system 100 may include an inlet 102 for a pre-conditioned air flow path 104. The pre-conditioned air flow path 104 may include outside air, air from a building adjacent to the enclosed structure 101, or air from a room within the enclosed structure 101. Airflow in the pre-conditioned air flow path 104 may be moved through the pre-conditioned air flow path 104 by a fan 106. The fan 106 directs the pre-conditioned air flow through path 104 to a supply air liquid-to-air membrane energy exchanger (LAMEE) 108. The supply air LAMEE 108 conditions the pre-conditioned air flow in path 104 to generate a change in air temperature and humidity (i.e. to pre-conditioned the air partly or fully) toward that which is required for a supply air flow condition to be discharged into the enclosed space 101. During a winter mode operation, the supply air LAMEE 108 may condition the pre-conditioned air flow path 104 by adding heat and moisture to the pre-conditioned air in flow path 104. In a summer mode operation, the supply air LAMEE 108 may condition the pre-conditioned air flow path 104 by removing heat and moisture from the pre-conditioned air in flow path 104. The pre-conditioned air 110 may be channeled to an HVAC system 112 of the enclosed structure 101. The HVAC system 112 may further condition the pre-conditioned air 110 to generate the desired temperature and humidity for the supply air 114 that is supplied to the enclosed structure 101.

As shown in FIG. 1, one fan 106 may be located upstream of the LAMEE 108. Optionally, the pre-conditioned air flow path 104 may be moved by a down-stream fan and/or by multiple fans or a fan array or before and after each LAMEE in the system.

Return air 116 is channeled out of the enclosed structure 101. A mass flow rate portion 118 of the return air 116 may be returned to the HVAC system 112. Another mass flow rate portion 119 of the return air 116 may be channeled to a return air or regeneration LAMEE 120. The portions 118 and 119 may be separated with a damper 121 or the like. For example, 80% of the return air 116 may be channeled to the HVAC system 112 and 20% of the return air 116 may be channeled to the return air LAMEE 120. The return air LAMEE 120 exchanges energy between the portion 119 of the return air 116 and the preconditioned air 110 in the supply air LAMEE 108. During a winter mode, the return air LAMEE 120 collects heat and moisture from the portion 119 of the return air 116. During a summer mode, the return air LAMEE 120 discharges heat and moisture into the portion 119 of the return air 116. The return air LAMEE 120 generates exhaust air 122. The exhaust air 122 is discharged from the structure 101 through an outlet 124. A fan 126 may be provided to move the exhaust air 122 from the return air LAMEE 120. The system 100 may include multiple fans 126 or one or more fan arrays located either up-stream or down-stream (as in FIG. 1) of the return air LAMEE 120.

A liquid, such as a desiccant fluid 127, flows between the supply air LAMEE 108 and the return air LAMEE 120. The desiccant fluid 127 transfers the heat and moisture between the supply air LAMEE 108 and the return air LAMEE 120. The system 100 may include desiccant storage tanks 128 in fluid communication between the supply air LAMEE 108 and the return air LAMEE 120. The storage tanks 128 store the desiccant fluid 127 as it is channeled between the supply air LAMEE 108 and the return air LAMEE 120. Optionally, the system 100 may not include both storage tanks 128 or may have more than two storage tanks. Pumps 130 are provided to move the desiccant fluid 127 from the storage tanks 128 to one of the supply air LAMEE 108 or the return air LAMEE 120. The illustrated embodiment includes two pumps 130. Optionally, the system 100 may be configured with as few as one pump 130 or more than two pumps 130. The desiccant fluid 127 flows between the supply air LAMEE 108 and the return air LAMEE 120 to transfer heat and moisture between the conditioned air 110 and the portion 118 of the return air 116.

The energy exchange system 100 of FIG. 1 is an example of the type of system that a LAMEE can be used within. It is recognized that the LAMEEs described herein can be used in other types of systems and designs configured for conditioning air for an enclosed space. In the example of FIG. 1, the LAMEEs 108 and 120 can operate in a passive manner such that the liquid desiccant is not conditioned or controlled. In other words, the system 100 may not include means to heat or cool the liquid desiccant or change a concentration of the liquid desiccant. In other examples, one or more LAMEEs, which are similar in design to the LAMEEs described herein, can be part of the HVAC system and the LAMEEs can be actively controlled. The liquid desiccant in the LAMEE can be heated or cooled depending on, for example, set point conditions of the HVAC system. Similarly, a concentration of the liquid desiccant can be increased or decreased by adding water or concentrated desiccant.

Figure 2:
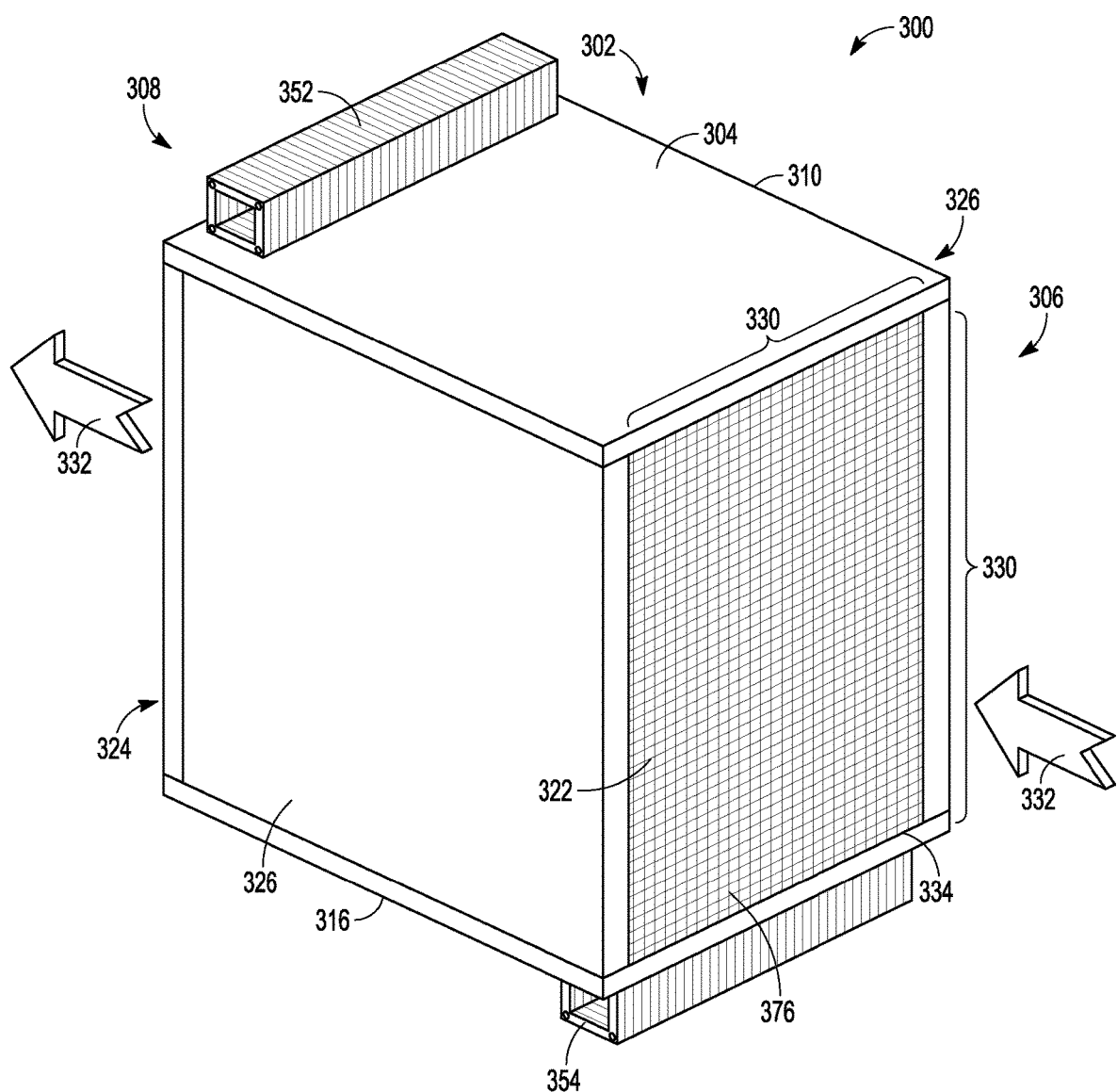
FIG. 2 is a side perspective view of an example liquid-to-air membrane energy exchanger in accordance with the present patent application.

FIG. 2 illustrates a side perspective view of an example of a LAMEE 300. The LAMEE 300 may be used as the supply air LAMEE 108 and/or the return or exhaust air LAMEE 120 (shown in FIG. 1). The LAMEE 300 includes a housing 302 having a body 304. The body 304 includes an air inlet end 306 and an air outlet end 308. A top 310 extends between the air inlet end 306 and the air outlet end 308. While not shown, a stepped-down top may be positioned at the air inlet end 306. The stepped-down top may be stepped a distance from the top 310. A bottom 316 extends between the air inlet end 306 and the air outlet end 308. While not shown, a stepped-up bottom may be positioned at the air outlet end 308. The stepped-up bottom may be stepped a distance from the bottom 316. In alternative designs the stepped-up bottom or stepped-down top sections may have different sizes of steps or no step at all. An air inlet 322 is positioned at the air inlet end 306. An air outlet 324 is positioned at the air outlet end 308. Sides 326 extend between the air inlet 322 and the air outlet 324.

An energy exchange cavity 330 extends through the housing 302 of the LAMEE 300. The energy exchange cavity 330 extends from the air inlet end 306 to the air outlet end 308. An air stream 332 is received in the air inlet 322 and flows through the energy exchange cavity 330. The air stream 332 is discharged from the energy exchange cavity 330 at the air outlet 324. The energy exchange cavity 330 may include a plurality of panels 334, such as liquid panels configured to receive desiccant and direct the flow of the desiccant therethrough.

A desiccant inlet reservoir 352 may be positioned on the top 310. The desiccant inlet reservoir 352 may be configured to receive desiccant, which may be stored in a storage tank 128 (shown in FIG. 1). The desiccant inlet reservoir 352 may include an inlet in flow communication with the storage tank 128. The desiccant is received through the inlet. The desiccant inlet reservoir 352 may also include an outlet that is in fluid communication with desiccant channels 376 of the panels 334 in the energy exchange cavity 330. The liquid desiccant flows through the outlet into the desiccant channels 376. The desiccant flows along the panels 334 through the desiccant channels 376 to a desiccant outlet reservoir 354, which may be positioned at or proximate the bottom 316. Accordingly, the desiccant may flow through the LAMEE 300 from top to bottom. For example, the desiccant may flow into the desiccant channels 376 proximate the desiccant inlet reservoir 352, through the desiccant channels 376, and out of the LAMEE 300 proximate to the desiccant outlet reservoir 354. In an alternative embodiment, the desiccant may flow through the LAMEE 300 from bottom to top.

Air from an enclosed space like a commercial or residential building enters the LAMEE 300 through the air inlet end 306. The air 332 entering the LAMEE 300 has a first temperature and a first humidity. The air 332 flows through one or more air flow channels in the LAMEE 300, which are separated from the liquid desiccant flowing through the LAMEE 300 by selectively permeable membrane(s). As the inlet air 332 flows through the LAMEE 300, the liquid desiccant acts to condition the air by altering the temperature and humidity of the air. For example, the liquid desiccant can have a lower temperature than the inlet air and can act to remove heat from the inlet air such that the conditioned air exiting the LAMEE 300 is at a lower temperature compared to the air entering the LAMEE 300.

Additionally, the hygroscopic property of the desiccant can allow the desiccant to either release or absorb water vapor from the inlet air depending, for example, on the water vapor pressure of the desiccant compared to that of the inlet air. For example, liquid desiccants with relatively low vapor pressures can provide a large potential for dehumidification of the inlet air flowing through the LAMEE 300. The conditioned air flowing out of the LAMEE 300 after being conditioned by the liquid desiccant separated from the air by the selectively permeable membrane has a second temperature and second humidity, which is different than the first temperature and first humidity of the inlet air.

Figure 3:
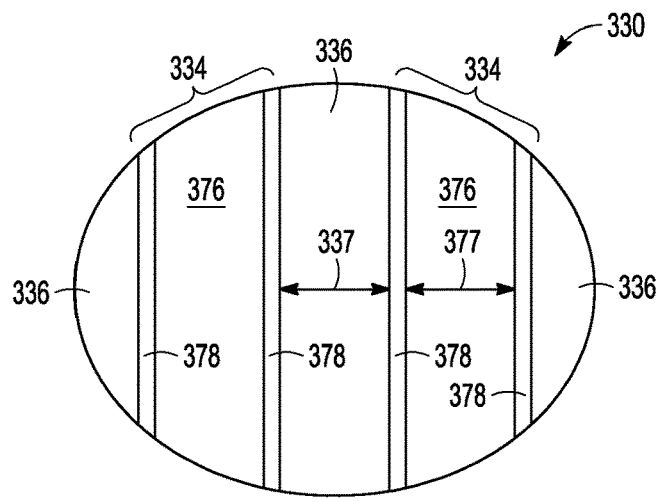
FIG. 3 is a cut-away front view of panels within an example energy exchange cavity of a liquid-to-air membrane energy exchanger in accordance with the present patent application.

FIG. 3 illustrates a cut-away front view of the panels 334 within the energy exchange cavity 330 of the LAMEE 300, according to an embodiment. The panels 334 may be solution or liquid panels configured to direct the flow of liquid, such as desiccant, therethrough, as explained below. The panels 334 form a liquid desiccant flow path 376 that is confined by semi-permeable membranes 378 on either side and is configured to carry desiccant therethrough. Each membrane 378 may be any flexible structure that may generally bulge under fluid pressure. The semi-permeable membranes 378 are arranged in parallel to form air channels 336 with an average flow channel width of 337 and liquid desiccant channels 376 with an average flow channel width of 377. In one embodiment, the semi-permeable membranes 378 are spaced to form uniform air channels 336 and liquid desiccant channels 376. The air stream 332 (shown in FIG. 2) travels through the air channels 336 between the semi-permeable membranes 378. The desiccant in each desiccant channel 376 exchanges heat and moisture with the air stream 332 in the air channels 336 through the semi-permeable membranes 378. The air channels 336 alternate with the liquid desiccant channels 376. Except for the two side panels of the energy exchange cavity, each air channel 336 may be positioned between adjacent liquid desiccant channels 376.

It is noted that for purposes of the present application, semi-permeable and selectively permeable have the same meaning.

In order to minimize or otherwise eliminate the liquid desiccant channels 376 from outwardly bulging or bowing, membrane support assemblies may be positioned within the air channels 336. The membrane support assemblies are configured to support the membranes, and may promote turbulent air flow between the air channels 336 and the membranes 378.

As an example, the LAMEE 300 may be similar to a LAMEE as described in WO 2011/161547, entitled "Liquid-To-Air Membrane Energy Exchanger," filed Jun. 22, 2011.

Figure 4:
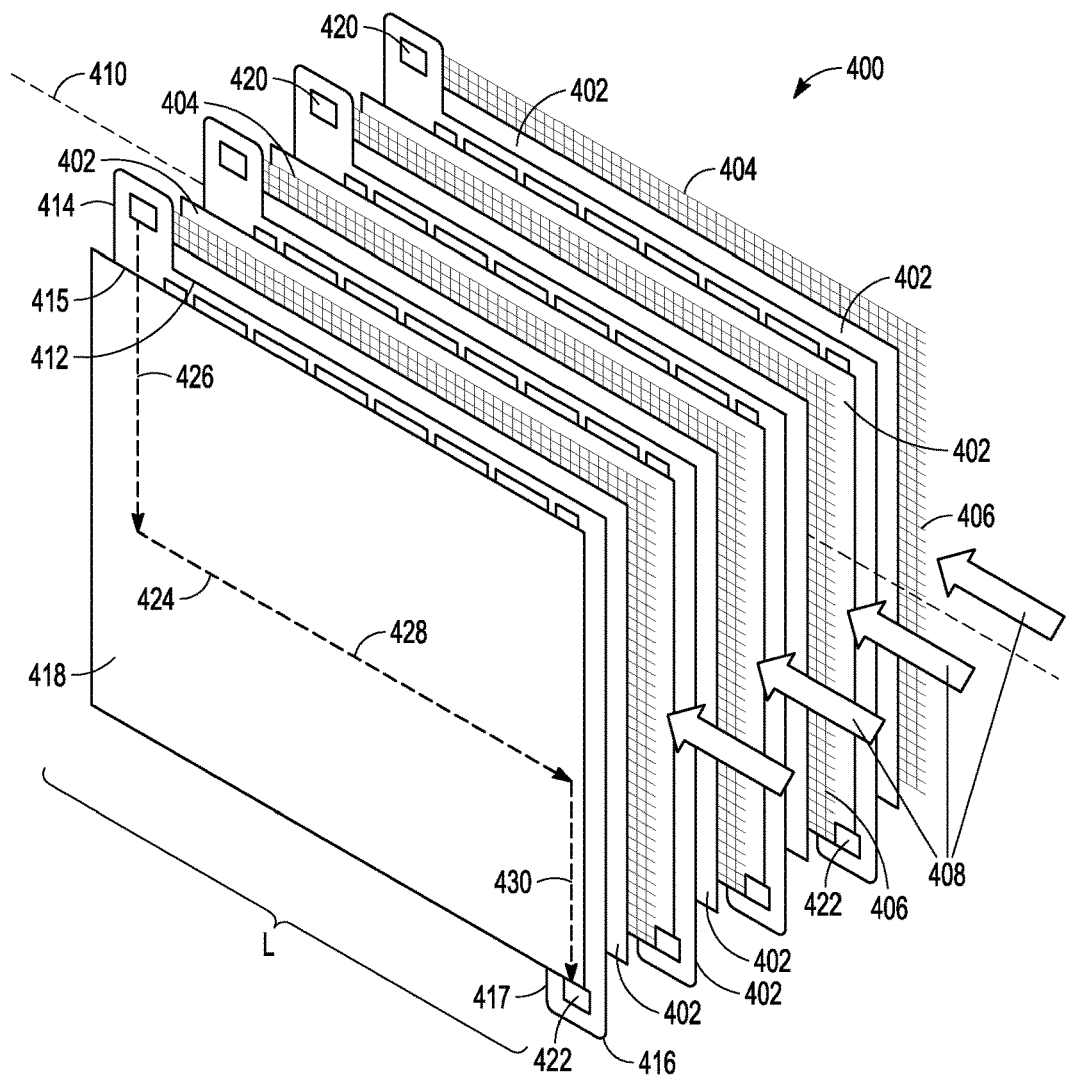
FIG. 4 is an exploded isometric top view of an example energy exchange cavity of a liquid-to-air membrane energy exchanger in accordance with the present patent application.

FIG. 4 illustrates an exploded isometric top view of an example of an energy exchange cavity 400. The energy exchange cavity 400 may include a plurality of liquid panel assemblies 402 spaced apart from one another by membrane support assemblies 404, such as those described in U.S. patent application Ser. No. 13/797,062, entitled "Membrane Support Assembly for an Energy Exchanger," filed Mar. 12, 2013, and published as US Pub. No. US 2014/0054004. The membrane support assemblies 404 may reside in air channels 406. For example, the membrane support assemblies 404 may prevent membranes 418 of the solution panel assemblies 402 from outwardly bulging or bowing into the air channels 406. Airflow 408 is configured to pass through the air channels 406 between liquid panel assemblies 402. As shown, the airflow 408 may generally be aligned with a horizontal axis 410 of the energy exchange cavity 400. Thus, the airflow 408 may be horizontal with respect to the energy exchange cavity 400. Notably, however, the membrane support assemblies 404 may include turbulence promoters configured to generate turbulence, eddies, and the like in the airflow 408 within the energy exchange cavity 400.

Each liquid panel assembly 402 may include a support frame 412 connected to an inlet member 414 at an upper corner 415 and an outlet member 416 at a lower corner 417 that may be diagonal to the upper corner 415. Further, membranes 418 are positioned on each side of the support frame 412. The membranes 418 sealingly engage the support frame 412 along outer edges in order to contain liquid within the liquid panel assembly 402. Alternatively, a single membrane may sealingly wrap around an entirety of the support frame 412.

Each inlet member 414 may include a liquid delivery opening 420, while each outlet member 416 may include a liquid passage opening 422. The liquid delivery openings 420 may be connected together through conduits, pipes, or the like, while the liquid passage openings 422 may be connected together through conduits, pipes, or the like. Optionally, the inlet members 414 and outlet members 416 may be sized and shaped to directly mate with one another so that a liquid-tight seal is formed therebetween. Accordingly, liquid, such as desiccant may flow through the liquid delivery openings 420 and the liquid passage openings 422. The inlet members 414 and outlet members 416 may be modular components configured to selectively couple and decouple from other inlet members 414 and outlet members 416, respectively. For example, the inlet members 414 and outlet members 416 may be configured to securely mate with other inlet members 414 and outlet members 416, respectively, through snap and/or latching connections, or through fasteners and adhesives.

As shown, the liquid panel assemblies 402, the membrane support assemblies 404, and the air channels 406 may all be vertically oriented. The liquid panel assemblies 402 may be flat plate exchangers that are vertically-oriented with respect to a base that is supported by a floor, for example, of a structure.

Alternatively, the liquid panel assemblies 402, the membrane support assemblies 404, and the air channels 406 may all be horizontally oriented. For example, the liquid panel assemblies 402 may be flat plate exchangers that are horizontally-oriented with respect to a base that is supported by a floor, for example, of a structure.

In operation, liquid, such as desiccant, flows into the liquid delivery openings 420 of the inlet members 414. For example, the liquid may be pumped into the liquid delivery openings 420 through a pump. The liquid then flows into the support frames 412 through a liquid path 424 toward the outlet members 416. As shown, the liquid path 424 includes a vertical descent 426 that connects to a horizontal, flow portion, such as a flow portion 428, which, in turn, connects to a vertical descent 430 that connects to the liquid passage opening 422 of the outlet member 416. The vertical descents 426 and 430 may be perpendicular to the horizontal, flow portion 428. As such, the liquid flows through the solution panel assemblies 402 from the top corners 415 to the lower corners 417. As shown, the length of the horizontal, flow portion 428 substantially exceeds half the length L of the liquid panel assemblies 402. The horizontal, flow portion 428 provides liquid, such as desiccant, that may counterflow with respect to the airflow 408. Alternatively, the flow portion may be a crossflow, parallel-aligned flow, or other such flow portion, for example.

The airflow 408 that passes between the liquid panel assemblies 402 exchanges energy with the liquid flowing through the liquid panel assemblies 402. The liquid may be a desiccant, refrigerant, or any other type of liquid that may be used to exchange energy with the airflow 408.

The energy exchange cavity 400 may include more or less liquid panel assemblies 402, membrane support assemblies 404, and air channels 406 than those shown in FIG. 4. The inlet and outlet members 414 and 416 may be modular panel headers that are configured to selectively attach and detach from neighboring inlet and outlet members 414 and 416 to provide a manifold for liquid to enter into and pass out of the liquid panel assemblies 402. Sealing agents, such as gaskets, silicone gel, or the like, may be disposed between neighboring inlet members 414 and neighboring outlet members 416. At least a portion of the membrane sealingly engages the inlet and outlet members 414 and 416. The liquid panel assembly 402 formed in this manner provides a fully-sealed, stand-alone unit having openings at the inlet and outlet members 414 and 416, notably the openings 420 and 422, respectively. Accordingly, the liquid panel assembly 402 may be pre-tested for leaks and membrane holes prior to being positioned within an energy exchange cavity, for example.

Additional details about the liquid panel assemblies 402 are provided in U.S. patent application Ser. No. 13/797,152, entitled "Liquid Panel Assembly", filed Mar. 12, 2013, and published as US Pub. No. US 2014/0054013.

Figure 5:
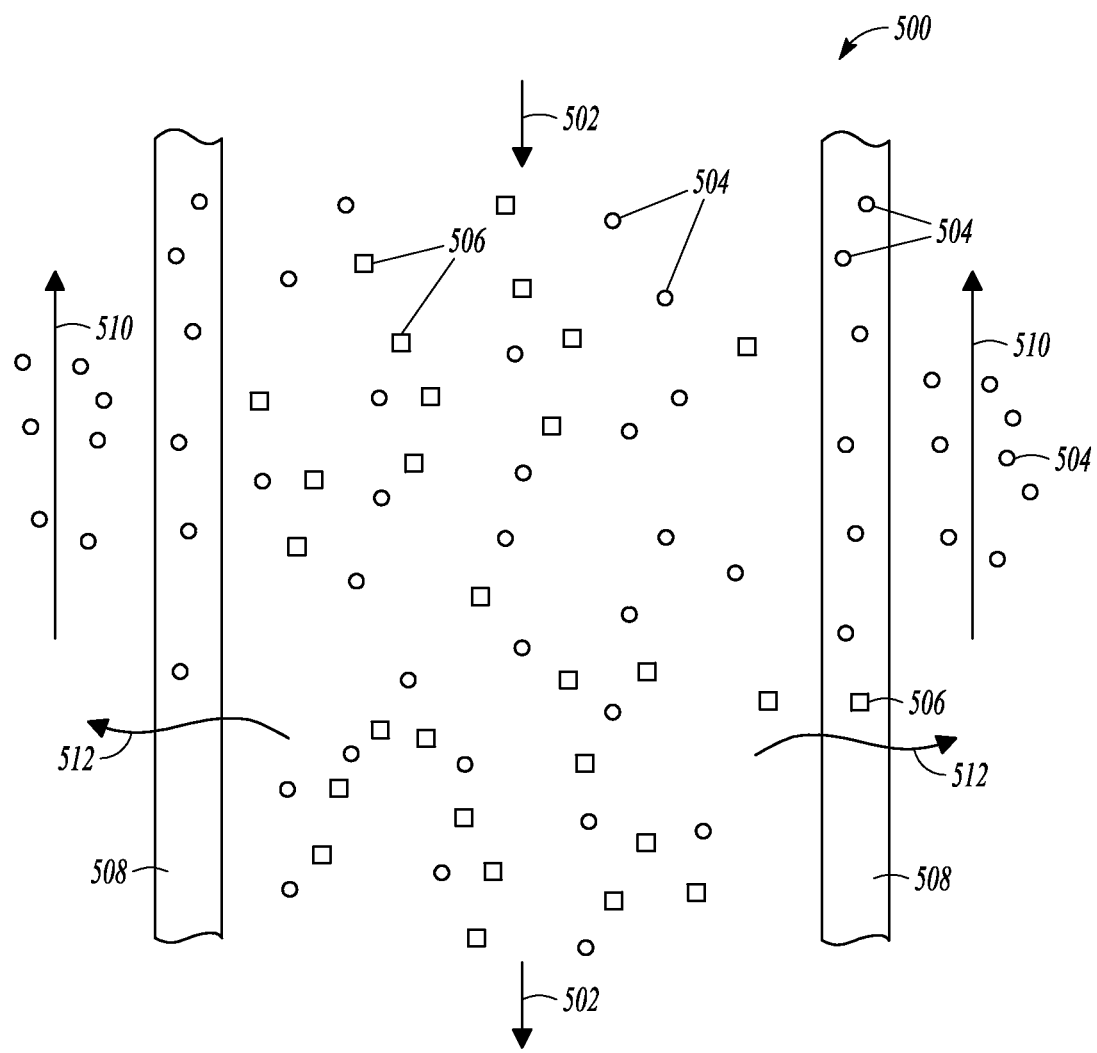
FIG. 5 is a cross-sectional view of an example panel of a liquid-to-air membrane energy exchanger in accordance with the present patent application.

FIG. 5 illustrates a cross-sectional view of an example of a panel 500 for use in a LAMEE. The panel 500 can be similar to the panels 334 described above and shown in FIG. 3, and multiple panels, like panel 500, can be included in the LAMEE. The panel 500 can be configured to direct the flow of liquid, such as desiccant, in a direction indicated by arrows 502. The liquid desiccant can include water 504 and one or more non-water constituents 506. The panel 500 can include a pair of membranes 508 that contain or seal the liquid desiccant. The flow of air, as indicated by arrows 510, can be in a direction opposite to the flow of liquid 502. Arrows 512 indicate a flux of water 504 from the liquid desiccant to the air through the membrane 508. The flux of water 504 can also be in the opposite direction of the arrows 512 in FIG. 5 and water can flow from the air to the desiccant.

The membrane 508 is non-porous and selectively permeable to water 504, but not permeable to the one or more non-water constituents 506 present in the liquid desiccant or air. In an example, the membrane 508 can be a non-porous film. The membrane 508 does not allow a general transfer of other species/constituent compounds present in the liquid desiccant or air, including the one or more non-water constituents 506, through the membrane 508. In some examples, the membrane 508 may allow a very low flux of the one or more non-water constituents 506 in the desiccant if the flux rate is considered acceptable for a given application. As such, the one or more non-water constituents 506 may not be completely contained by the membranes 508. As shown in FIG. 5, a non-water constituent 506 may permeate the membrane 508; however, the panel 500 is configured such that the one or more non-water constituents 506 are larger contained by the membrane 508. The panel 500 is thus able to function sufficiently in the LAMEE without having to replace the liquid desiccant more frequently than normal or acceptable.

In an example, the membrane 508 is a solution-diffusion membrane which facilitates transport of the water 504 through the membrane 508. The transport can be provided by, for example, ion conduction channels in the membrane 508. Thus transport can be guided by specific structural features in the membrane 508; alternatively, in other examples, transport can occur at any location on the membrane 508.

The water molecules 504 can be transported from the liquid desiccant through the membrane 508 to the air which is flowing in an opposite direction to the flow of the liquid desiccant. Similarly, water from the air can be transported from the air through the membrane 508 to the liquid desiccant, depending on particular conditions of the air. The water molecules 504 may be transported through the membrane 508 as ions (such as, for example, $H^+$ and $OH^-$ ions) rather than as $H_2O$ molecules. The water molecules 504 may be transported through the membrane 508 in a liquid or vapor phase.

Various types of selectively permeable, non-porous membranes can be used as the membrane 508. In an example, ion-exchange membranes can be designed to be selectively permeable to ionic species and water. Examples of ion-exchange membranes with a selective permeability for water include Nexar® polymers, which are sulfonated block copolymers from Kraton Performance Polymers (reference is made to U.S. Pat. No. 7,737,224), and Aquivion® PFSA from Solvay Plastics. Membranes formed of these materials can include, for example, Short Side Chain (SSC) copolymer of Tetrafluoroethylene and a Sulfonyl Fluoride Vinyl Ether (SFVE) $F_2C=CF-OCF_2CF_2-SO_2F$ of low molecular weight. It is recognized that these polymers can be modified to achieve desired characteristics.

Pervaporation membranes can be used as the membrane 508. Hydrophilic pervaporation membranes have been developed for dehydration of organic solvents such as glycols, alcohols, and other azeotropic or close boiling mixtures. These membranes are selectively permeable to water, and when the liquid solution is exposed to the membrane with a vacuum or low vapor pressure gas on the other side, the water selectively permeates/diffuses through the membrane and then evaporates on the side with the gas phase while the solvent is isolated on the liquid side.

Pervaporation membranes are currently available with high flux rates, high selectivity ratio, and good thermal/chemical stability. Examples include cross-linked chitosan, ceramic, silica-based, polyvinyl alcohol, and polyimide-based membranes.

It is recognized that the non-porous membrane 508 can include at least one porous portion or layer. In an example, a non-porous film can be deposited onto a porous substrate and the porous substrate can act as a supporting layer to the non-porous film. In some examples, a backer layer can also be included with the porous substrate and non-porous film. The backer layer can be thicker than the porous substrate and thicker than the non-porous film, and can be formed, for example, from a spun bond or other fibrous material. The non-porous film can be very thin, relative to the porous layer and the backer layer.

Various types of liquid desiccants can be used within the panel 500 of FIG. 5, in combination with the non-porous, selectively permeable membrane 508. In an example, the liquid desiccant can include a glycol or glycol-water solution. Glycols are traditionally considered to be unsuitable for use in a LAMEE because glycols are volatile and evaporate. However, a glycol based liquid desiccant can be used here with a non-porous membrane since the glycol can be largely contained within the pair of membranes securing the liquid desiccant.

In an example, the liquid desiccant can include glycols, or glycol-based solutions, such as triethylene glycol and propylene glycol, which are non-toxic, compatible with most metals and comparatively low in cost. Glycols can be strongly hygroscopic at higher concentrations. For example, a 95% solution of triethylene glycol has a comparable drying/dehumidification potential to lithium chloride near saturation. Triethylene glycol and tripropylene glycol can have low vapor pressures, but can be expensive. Less expensive and higher vapor pressure glycols, such as ethylene glycol, diethylene glycol, propylene glycol and dipropylene glycol, can be used herein.

In an example, the liquid desiccant can include an acetate salt, such as, but not limited to, an aqueous potassium acetate and an aqueous sodium acetate. Other examples of liquid desiccants usable in the system described herein include, but are not limited to, hygroscopic polyol based solutions, sulfuric acid and phosphoric acid. Glycerol is an example of a hygroscopic polyol usable herein.

As described above, salt-based desiccants can have disadvantages when used with energy exchangers similar to those described herein; however, such salt-based desiccants can offer advantages as well, since these types of desiccants are generally not volatile and are resistant to degradation. Examples of salt-based desiccants usable herein include lithium chloride, magnesium chloride, calcium chloride, lithium bromide, lithium iodide, potassium fluoride, zinc bromide, zinc iodide, calcium bromide, sodium iodide and sodium bromide.

In summary, any type of liquid desiccant compatible with a non-porous membrane and useful in conditioning air can be used in the panel 500 and LAMEEs described herein. The types of liquid desiccant can include, but are not limited to, an acetate salt solution, a halide salt solution, a hygroscopic polyol based solution, a glycol based solution, a sulfuric acid solution, a phosphoric acid solution, and any combinations thereof. It is recognized that mixtures of desiccants can be used as the liquid desiccant in the panel 500 and LAMEEs described herein.

Figure 6:
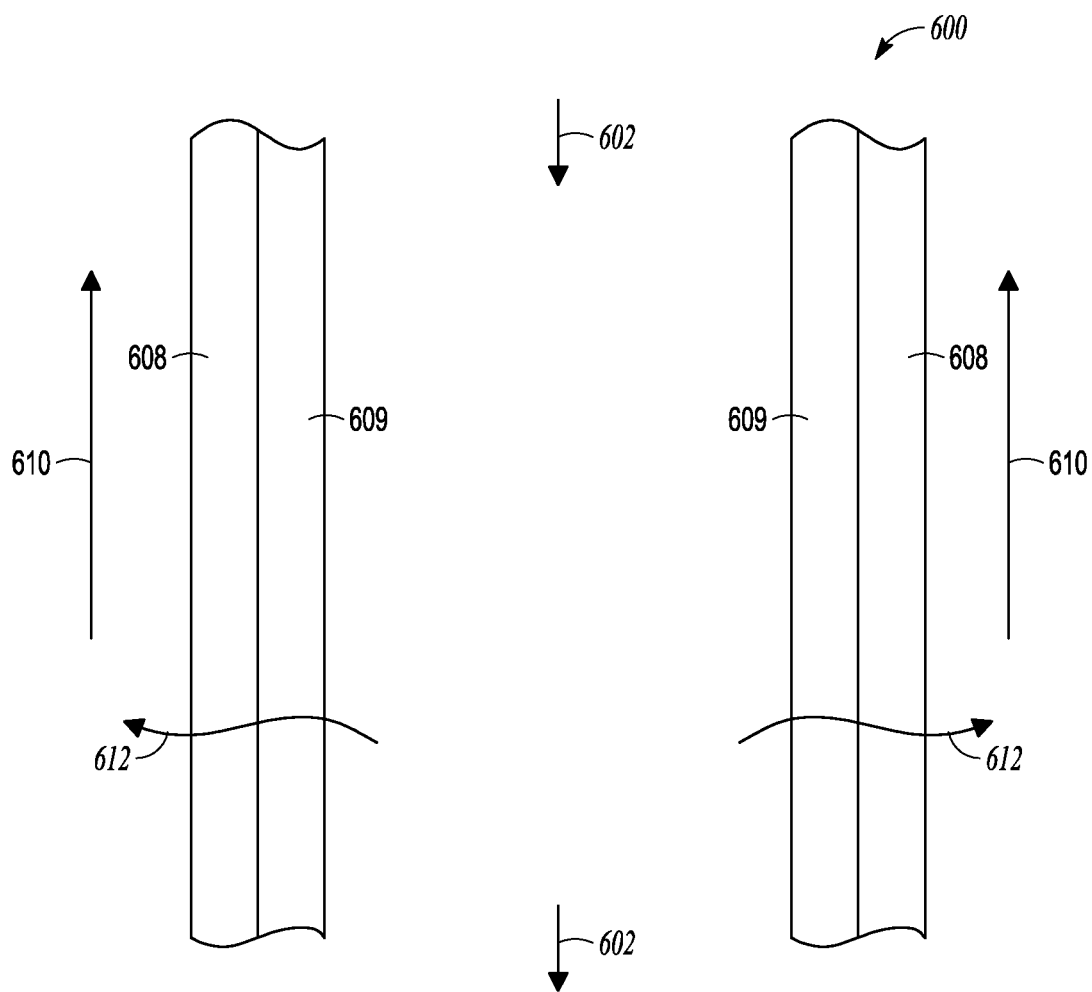
FIG. 6 is a cross-sectional view of another example of a panel of a liquid-to-air membrane energy exchanger in accordance with the present patent application.

FIG. 6 illustrates a cross-sectional view of another example of a panel 600 for use in a LAMEE. The panel 600 can be configured similarly to the panel 500 to direct the flow of liquid, such as desiccant, in a direction indicated by arrows 602, and air flow, as indicated by arrows 610, in a direction opposite to the flow of liquid 602. The liquid desiccant can be contained within a liquid channel by way of membranes 608 that contain or seal the liquid desiccant. For simplicity, the species that make up the liquid desiccant (such as water and one or more non-water constituents, like species 504 and 506, respectively, in FIG. 5) are not shown in FIG. 6.

The panel 600 can include a multi-layer membrane design. In addition to non-porous membranes 608, the panel 600 can also include microporous membranes 609 adjacent to porous membranes 608. The microporous membranes 609 can provide chemical or structural stability. The microporous membranes 609 can be air permeable, whereas the non-porous membranes 608 can be air impermeable. In an example, each microporous membrane 609 can be bonded to the adjacent porous membrane 608, by lamination, deposition or other known bonding techniques. As similarly described above in reference to FIG. 5, arrows 612 indicate a flux of water (liquid or vapor) from the liquid desiccant to the air through the membranes 608 and 609; alternatively, the flux of water can be in the opposite direction and water can flow from the air to the desiccant.

As shown, the microporous membranes 609 are in contact with the desiccant and the porous membranes 608 are in contact with the air. In another example, the microporous membranes 609 can be in contact with the air and the non-porous membranes 608 can be in contact with the desiccant. The microporous membranes 609 can each be formed of multiple microporous sublayers with different chemical and/or physical properties, such as corrosion resistance and pore size. Similarly, the non-porous membranes 608 can each be formed of multiple non-porous layers of different compositions and characteristics.

In another example, each side of the panel 600 can include more than two layers with alternating non-porous 608 and microporous 609 membranes.

In an example, the microporous membranes 609 can include polytetrafluoroethylene (PTFE), which is chemically stable and able to resist degradation. As such, it can be beneficial, in an example, to have the microporous membranes 609 in contact with the desiccant. In an example, a microporous membrane 609 including PTFE can be used in combination with a liquid desiccant including a halide salt, and the microporous membranes 609 and the non-porous membranes 608 can be configured as shown in FIG. 6. The PTFE-containing membrane 609 (on the desiccant side) is chemically compatible with the halide salt of the liquid desiccant, and the non-porous membrane 608 (on the air side) can combat potential leaking of the desiccant through the microporous membrane 609.

Figure 7:
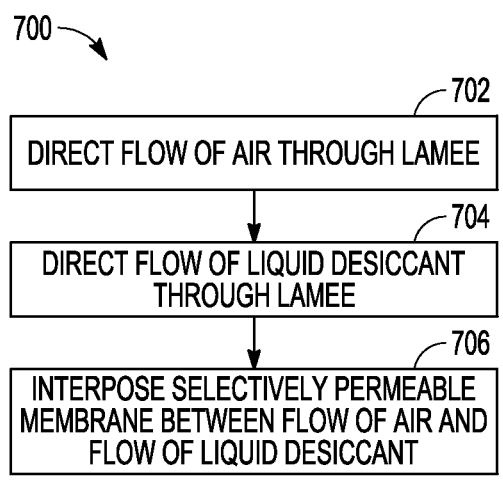
FIG. 7 is a flow chart for an example of a method in accordance with the present patent application.

FIG. 7 is a flowchart depicting an example method 700 for operating a LAMEE in accordance with the present application. The method 700 of FIG. 7 can include step 702 of directing a flow of air through a liquid to air membrane energy exchanger (LAMEE), step 704 of directing a flow of liquid desiccant through the LAMEE, and step 706 of interposing a selectively permeable membrane between the flow of air and the flow of liquid desiccant in the LAMEE. The membrane is non-porous and selectively permeable to water in the air and liquid desiccant flowing through the LAMEE. In other words, the selectively permeable membrane is permeable to water but generally not permeable to the one or more non-water constituents present in the liquid desiccant or air, recognizing that that the membrane may be permeable to the non-water constituents at an acceptably low flux rate.

In an example, the method 700 can optionally include interposing a microporous membrane between the flow of air and the flow of liquid desiccant. The microporous membrane can be adjacent to or bonded to the selectively permeable membrane.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The present application provides for the following exemplary embodiments or examples, the numbering of which is not to be construed as designating levels of importance:

Example 1 provides a liquid to air membrane energy exchanger (LAMEE) and can comprise at least one air flow channel comprising a first inlet for receiving a flow of air into the LAMEE and a first outlet for exhausting the flow of air out of the LAMEE, a temperature and a humidity of the air changing between the first inlet and the first outlet. The LAMEE can also comprise at least one liquid desiccant channel comprising a second inlet for receiving a flow of liquid desiccant into the LAMEE and a second outlet for expelling the flow of liquid desiccant from the LAMEE, and a selective permeable, non-porous membrane interposed between the flow of air and the flow of liquid desiccant. The membrane can be selectively permeable to water in the flow of air and the flow of liquid desiccant. Water molecules or ions can be transportable through the membrane to transfer water between the air and the liquid desiccant.

Example 2 provides the LAMEE of Example 1 optionally configured such that the selectively permeable, non-porous membrane comprises at least one of an ion exchange membrane, a pervaporation membrane, and a solution diffusion membrane.

Example 3 provides the LAMEE of any of Examples 1 or 2 optionally configured such that the flow of liquid desiccant comprises a solution of glycol and water.

Example 4 provides the LAMEE of Example 3 optionally configured such that the glycol is selected from the group consisting of triethylene glycol, tripropylene glycol, ethylene glycol, diethylene glycol, propylene glycol, dipropylene glycol, and combinations thereof.

Example 5 provides the LAMEE of any of Examples 1-4 optionally configured such that the flow of liquid desiccant comprises an acetate salt.

Example 6 provides the LAMEE of Example 5 optionally configured such that the acetate salt comprises at least one of aqueous potassium acetate and aqueous sodium acetate.

Example 7 provides the LAMEE of any of Examples 1-6 optionally configured such that the flow of liquid desiccant comprises a solution of one or more halide salts and water.

Example 8 provides the LAMEE of Example 7 optionally configured such that the one or more halide salts are selected from the group consisting of lithium chloride, magnesium chloride, calcium chloride, lithium bromide, lithium iodide, potassium fluoride, zinc bromide, zinc iodide, calcium bromide, sodium iodide, sodium bromide, and combinations thereof.

Example 9 provides the LAMEE of any of Examples 1-8 optionally configured such that the flow of liquid desiccant comprises a desiccant selected from the group consisting of a hygroscopic polyol based solution, sulfuric acid, phosphoric acid, and combinations thereof.

Example 10 provides the LAMEE of any of Examples 1-9 optionally configured such that the selectively permeable, non-porous membrane is attached to a porous layer.

Example 11 provides the LAMEE of Example 10 optionally configured such that the non-porous membrane is adjacent to the at least one air flow channel and the porous layer is adjacent to the at least one liquid desiccant channel.

Example 12 provides the LAMEE of Example 10 optionally configured such that the non-porous membrane is adjacent to the at least one liquid desiccant channel and the porous layer is adjacent to the at least one air flow channel.

Example 13 provides the LAMEE of any of Examples 1-12 optionally configured such that the flow of liquid desiccant is selected from the group consisting of an acetate salt solution, a halide salt solution, a hygroscopic polyol based solution, a glycol based solution, a sulfuric acid solution, a phosphoric acid solution, and any combinations thereof.

Example 14 provides a liquid to air membrane energy exchanger (LAMEE) and can comprise a plurality of semipermeable, non-porous membranes arranged in parallel, and a liquid desiccant channel formed by first and second membranes of the plurality of membranes. The first and second membranes can be adjacent to one another and the liquid desiccant channel can be configured to receive a liquid desiccant flowing through the liquid desiccant channel. The LAMEE can further comprise an air channel adjacent to the liquid desiccant channel and formed by the second membrane and a third membrane of the plurality of membranes. The second and third membranes can be adjacent to one another and the air channel can be configured to receive air flowing through the air channel. The liquid desiccant can condition the air flowing through the air channel, and at least one of a temperature and humidity of the air at an inlet of the air channel can be different than a temperature and humidity of the air at an outlet of the air channel. Each of the membranes of the plurality of membranes can be selectively permeable to water in the air and liquid desiccant.

Example 15 provides the LAMEE of Example 14 optionally configured such that each of the membranes of the plurality of membranes is attached to a porous layer.

Example 16 provides the LAMEE of any of Examples 14 or 15 optionally configured such that each of the membranes of the plurality of membranes is selected form the group consisting of a solution diffusion membrane, an ion exchange membrane, and a pervaporation membrane.

Example 17 provides the LAMEE of any of Examples 14-16 optionally configured such that the liquid desiccant is selected from the group consisting of an acetate salt solution, a halide salt solution, a hygroscopic polyol based solution, a glycol based solution, a sulfuric acid solution, a phosphoric acid solution, and any combinations thereof.

Example 18 provides the LAMEE of any of Examples 14-17 optionally further comprising additional liquid desiccant channels and air channels formed by adjacent membranes of the plurality of membranes, wherein the liquid desiccant channels and air channels are arranged in an alternating pattern.

Example 19 provides the LAMEE of any of Examples 14-18 optionally configured such that the air channel is configured to receive air flowing through the air channel in a direction opposite to the liquid desiccant flowing through the liquid desiccant channel.

Example 20 provides a method of conditioning air in an enclosed space and can comprise providing a liquid to air membrane energy exchanger (LAMEE) comprising a non-porous membrane selectively permeable to water, directing a flow of air through the LAMEE and a directing a flow of liquid desiccant through the LAMEE. The liquid desiccant can condition the air and at least one of a temperature and a humidity of the air at an inlet of the LAMEE is different than a temperature and a humidity of the air at an outlet of the LAMEE. Water in the air and liquid desiccant is transportable through the membrane.

Example 21 provides the method of Example 20 optionally configured such that the flow of liquid through the LAMEE is in an opposite direction to the flow of air through the LAMEE.

Example 22 provides the method of any of Examples 20 or 21 optionally configured such that the liquid desiccant is selected from the group consisting of an acetate salt solution, a halide salt solution, a hygroscopic polyol based solution, a glycol based solution, a sulfuric acid solution, a phosphoric acid solution, and any combinations thereof.

Example 23 provides the method of Example 22 optionally configured such that the liquid desiccant comprises a glycol based solution of water and glycol, and the glycol is selected form the group consisting of triethylene glycol, tripropylene glycol, ethylene glycol, diethylene glycol, propylene glycol, dipropylene glycol, and combinations thereof.

Example 24 provides the method of any of Examples 20-23 optionally configured such that the non-porous membrane comprises at least one of an ion exchange membrane, a pervaporation membrane, and a solution diffusion membrane.

Example 25 provides a system, LAMEE, or method of any one or any combination of Examples 1-24, which can be optionally configured such that all steps or elements recited are available to use or select from.

Various aspects of the disclosure have been described. These and other aspects are within the scope of the following claims.

The invention claimed is:

1. A liquid to air membrane energy exchanger (LAMEE) comprising:
   a liquid desiccant comprising a hygroscopic fluid;
   at least one air flow channel comprising a first inlet for receiving air into the LAMEE and a first outlet for exhausting the air out of the LAMEE, a temperature and a humidity of the air changing between the first inlet and the first outlet;
   at least one liquid desiccant channel comprising a second inlet for receiving the liquid desiccant into the LAMEE and a second outlet for expelling the liquid desiccant from the LAMEE; and
   a selectively permeable, non-porous membrane interposed between the air and the liquid desiccant, the membrane being selectively permeable to water in the air and the liquid desiccant, wherein water molecules or ions are transportable through the membrane to transfer water between the air and the liquid desiccant.

2. The LAMEE of claim 1, wherein the selectively permeable, non-porous membrane comprises at least one of an ion exchange membrane, a pervaporation membrane, and a solution diffusion membrane.

3. The LAMEE of claim 1, wherein the liquid desiccant comprises a solution of glycol and water.

4. The LAMEE of claim 3, wherein the glycol is selected from the group consisting of triethylene glycol, tripropylene glycol, ethylene glycol, diethylene glycol, propylene glycol, dipropylene glycol, and combinations thereof.

5. The LAMEE of claim 1, wherein the liquid desiccant comprises an acetate salt.

6. The LAMEE of claim 5, wherein the acetate salt comprises at least one of aqueous potassium acetate and aqueous sodium acetate.

7. The LAMEE of claim 1, wherein the liquid desiccant comprises a solution of one or more halide salts and water.

8. The LAMEE of claim 7, wherein the one or more halide salts are selected from the group consisting of lithium chloride, magnesium chloride, calcium chloride, lithium bromide, lithium iodide, potassium fluoride, zinc bromide, zinc iodide, calcium bromide, sodium iodide, sodium bromide, and combinations thereof.

9. The LAMEE of claim 1, wherein the liquid desiccant comprises a desiccant selected from the group consisting of a hygroscopic polyol based solution, sulfuric acid, phosphoric acid, and combinations thereof.

10. The LAMEE of claim 1, wherein the selectively permeable, non-porous membrane is attached to a porous layer.

11. The LAMEE of claim 10, wherein the non-porous membrane is adjacent to the at least one air flow channel and the porous layer is adjacent to the at least one liquid desiccant channel.

12. The LAMEE of claim 10, wherein the non-porous membrane is adjacent to the at least one liquid desiccant channel and the porous layer is adjacent to the at least one air flow channel.

13. The LAMEE of claim 1, wherein the liquid desiccant is selected from the group consisting of an acetate salt solution, a halide salt solution, a hygroscopic polyol based solution, a glycol based solution, a sulfuric acid solution, a phosphoric acid solution, and any combinations thereof.

14. A liquid to air membrane energy exchanger (LAMEE) comprising:
    a liquid desiccant comprising a hygroscopic fluid;
    a plurality of semi-permeable, non-porous membranes arranged in parallel;
    a liquid desiccant channel formed by first and second membranes of the plurality of membranes, the first and second membranes being adjacent to one another, the liquid desiccant channel configured to receive the liquid desiccant flowing through the liquid desiccant channel; and
    an air channel adjacent to the liquid desiccant channel and formed by e second membrane and a third membrane of the plurality of membranes, the second and third membranes being adjacent to one another, the air channel configured to receive air flowing through the air channel,
    wherein the liquid desiccant conditions the air flowing through the air channel, and at least one of a temperature and humidity of the air at an inlet of the air channel is different than a temperature and humidity of the air at an outlet of the air channel, and wherein each of the membranes of the plurality of membranes is selectively permeable to water in the air and liquid desiccant.

15. The LAMEE of claim 14, wherein each of the membranes of the plurality of membranes is attached to a porous layer.

16. The LAMEE of claim 14, wherein each of the membranes of the plurality of membranes is selected form the group consisting of a solution diffusion membrane, an ion exchange membrane, and a pervaporation membrane.

17. The LAMEE of claim 14, wherein the liquid desiccant is selected from the group consisting of an acetate salt solution, a halide salt solution, a hygroscopic polyol based solution, a glycol based solution, a sulfuric acid solution, a phosphoric acid solution, and any combinations thereof.

18. The LAMEE of claim 14, further comprising additional liquid desiccant channels and air channels formed by adjacent membranes of the plurality of membranes, wherein the liquid desiccant channels and air channels are arranged in an alternating pattern.

19. The LAMEE of claim 14, wherein the air channel is configured to receive air flowing through the air channel in a direction opposite to the liquid desiccant flowing through the liquid desiccant channel.

20. A method of conditioning air in an enclosed space, the method comprising:
    providing a liquid to air membrane energy exchanger (LAMEE) comprising a non-porous membrane selectively permeable to water;
    directing a flow of air through the LAMEE; and
    directing a flow of liquid desiccant through the LAMEE, wherein the liquid desiccant conditions the air, and at least one of a temperature and a humidity of the air at an inlet of the LAMEE is different than a temperature and a humidity of the air at an outlet of the LAMEE, and wherein water in the air and liquid desiccant is transportable through the membrane.

21. The method of claim 20 wherein the flow of liquid through the LAMEE is in an opposite direction to the flow of air through the LAMEE.

22. The method of claim 20, wherein the liquid desiccant is selected from the group consisting of an acetate salt solution, a halide salt solution, a hygroscopic polyol based solution, a glycol based solution, a sulfuric acid solution, a phosphoric acid solution, and any combinations thereof.

23. The method of claim 22, wherein the liquid desiccant comprises a glycol based solution of water and glycol, and the glycol is selected form the group consisting of triethylene glycol, tripropylene glycol, ethylene glycol, diethylene glycol, propylene glycol, dipropylene glycol, and combinations thereof.

24. The method of claim 20, wherein the non-porous membrane comprises at least one of an ion exchange membrane, a pervaporation membrane, and a solution diffusion membrane.

* * * * *

UNITED STATES PATENT AND TRADEMARK OFFICE
CERTIFICATE OF CORRECTION

PATENT NO. : 10,712,024 B2
APPLICATION NO. : 14/830492
DATED : July 14, 2020
INVENTOR(S) : LePoudre et al.

It is certified that error appears in the above-identified patent and that said Letters Patent is hereby corrected as shown below:

On the Title Page

On page 6, in Column 2, under "Other Publications", Line 12, delete ""Desi-Wringer#" and insert --"Desi-Wringer™-- therefor On page 8, in Column 1, under "Other Publications", Line 1, delete ""Mimimum-dissipation" and insert --"Minimum-dissipation-- therefor On page 8, in Column 1, under "Other Publications", Line 7, delete "Mositure" and insert --Moisture-- therefor In the Claims In Column 18, Line 8, in Claim 14, delete "e" and insert --the-- therefor Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*